United States Patent
Saadat Dehghan et al.

(10) Patent No.: US 11,691,285 B2
(45) Date of Patent: Jul. 4, 2023

(54) METHOD AND COMPUTING SYSTEM FOR ESTIMATING PARAMETER FOR ROBOT OPERATION

(71) Applicant: MUJIN, INC., Tokyo (JP)

(72) Inventors: Atilla Saadat Dehghan, Tokyo (JP); Kei Usui, Tokyo (JP)

(73) Assignee: MUJIN, INC., Tokyo (JP)

( * ) Notice: Subject to any disclaimer, the term of this patent is extended or adjusted under 35 U.S.C. 154(b) by 51 days.

(21) Appl. No.: 17/243,939

(22) Filed: Apr. 29, 2021

(65) Prior Publication Data

US 2021/0347049 A1 Nov. 11, 2021

Related U.S. Application Data

(60) Provisional application No. 63/021,089, filed on May 7, 2020.

(51) Int. Cl.
  *B25J 9/16* (2006.01)
  *B25J 9/06* (2006.01)
  (Continued)

(52) U.S. Cl.
  CPC .............. *B25J 9/1664* (2013.01); *B25J 9/06* (2013.01); *B25J 9/12* (2013.01); *B25J 9/1633* (2013.01);
  (Continued)

(58) Field of Classification Search
  CPC ..... B25J 9/06; B25J 9/12; B25J 9/1633; B25J 9/1641; B25J 9/1664; B25J 9/1692;
  (Continued)

(56) References Cited

U.S. PATENT DOCUMENTS 8,340,821 B2  12/2012  Ito et al.
10,493,632 B2  12/2019  Oguri et al.
(Continued)

FOREIGN PATENT DOCUMENTS

CN  101362335 A  2/2009
CN  108453735 A  8/2018
(Continued)

OTHER PUBLICATIONS

Chinese Office Action issued in corresponding Chinese Application No. 202111148035.6 dated Feb. 11, 2022.
(Continued)

*Primary Examiner* — Dale Moyer
(74) *Attorney, Agent, or Firm* — Medler Ferro Woodhouse & Mills PLLC

(57) ABSTRACT

A computing system and method for estimating friction and/or center of mass (CoM) are presented. The system may perform the method by selecting at least one of: (i) a first joint from among a plurality of joints, or (ii) a first arm segment from among a plurality of arm segments. The computing system further outputs a set of one or more movement commands for causing robot arm movement that includes relative movement between the first arm segment and a second arm segment via the first joint, and receiving a set of actuation data and a set of movement data associated with the first joint or the first arm segment. The computing system further determines, based on the set of actuation data and the set of movement data, at least one of: (i) a friction parameter estimate or (ii) a CoM estimate.

20 Claims, 28 Drawing Sheets

(51) Int. Cl.
  *B25J 9/12* (2006.01)
  *B25J 13/08* (2006.01)

(52) U.S. Cl.
  CPC ............ *B25J 9/1692* (2013.01); *B25J 13/085* (2013.01); *B25J 9/1641* (2013.01); *G05B 2219/37373* (2013.01); *G05B 2219/39181* (2013.01)

(58) Field of Classification Search
  CPC ......... B25J 13/085; G05B 2219/37373; G05B 2219/39181
  See application file for complete search history.

(56) References Cited

U.S. PATENT DOCUMENTS

| | | | |
|---|---|---|---|
| 10,661,453 B2 | 5/2020 | Koenig et al. | |
| 2004/0093119 A1* | 5/2004 | Gunnarsson | B25J 9/1638 700/245 |
| 2010/0087955 A1* | 4/2010 | Tsusaka | B25J 9/0003 700/245 |
| 2017/0290601 A1 | 10/2017 | Hongo et al. | |
| 2021/0291364 A1* | 9/2021 | Li | G05B 17/02 |

FOREIGN PATENT DOCUMENTS

| | | |
|---|---|---|
| CN | 108472028 A | 8/2018 |
| JP | 2018089744 A | 6/2018 |

OTHER PUBLICATIONS

International Search Report (ISA/210) and Written Opinion of the International Search Authority (ISA/237) for International Patent Application No. PCT/JP2021/017442 issued/mailed by the Japan Patent Office dated Aug. 3, 2021.

Nevmerzhitsky et al., "Friction Model of Industrial Robot Joint with Temperature Correction by Example of KUKA KR10", Research Article, Hindawi, Journal of Robotics, vol. 2019, Article ID 6931563, 11 pgs., https://doi.org/10.1155/2019/6931563.

Afrough et al., "Identification of Dynamic Parameters and Friction Coefficients of a Robot with Planar Serial Kinemtic Linkage", Journal of Intelligent & Robotic Systems, Springer, JReceived: Jul. 24, 2016/Accepted: Jan. 19, 2018, © Springer Science+Business Media B.V., part of Springer Nature 2018, Published online: Mar. 2, 2018, 13 pgs., https://doi.org/10.1007/S10846-018-0778-8.

Khan et al., "A review of friction models in interacting joints for durability design", NanoCorr, Energy & Modelling (NCEM) Research, Department of Design & Engineering, Bournemouth University, Bournemouth, United Kingdom, Received: Jul. 31, 2016 / Revised: Oct. 26, 2016 / Accepted: Dec. 16, 2016, ©The author(s) 2017. This article is published with open access at Springerlink.com, Friction 5(1): 1-22 (2017), DOI 10.1007/S40544-017-0143-0, CN 10-1237/ TH, ISSN 2223-7690, 22 pgs.

Świder et al., "Viscous friction measurement technique in robot joint with the use of surrogate mass", Faculty of Mechanical Engineering, The Silesian University of Technology, Pomiary Automatyka Robotyka nr Dec. 2012, pp. 121-128.

\* cited by examiner

METHOD AND COMPUTING SYSTEM FOR ESTIMATING PARAMETER FOR ROBOT OPERATION

CROSS-REFERENCE TO RELATED APPLICATION(S)

The present application claims the benefit of U.S. Provisional Application No. 63/021,089, entitled "A ROBOTIC SYSTEM WITH ROBOT OPERATION PARAMETER DETERMINATION," and filed May 7, 2020, the entire content of which is incorporated by reference herein.

FIELD OF THE INVENTION

The present disclosure is related to a method and computing system for estimating one or more parameters for robot operation.

BACKGROUND OF THE INVENTION

As automation becomes more common, robots are being used in more environments, such as in warehousing and retail environments. For instance, robots may be used to interact with objects in a warehouse. The movement of the robot may be fixed, or may be based on an input, such as information generated by a sensor in the warehouse.

However, despite technological advancements, robots often lack the sophistication necessary to duplicate human interactions required for executing larger and/or more complex tasks. In order for a robot to approximate human action, the robot should be calibrated in order to control movement of the robot with accuracy and precision.

SUMMARY

One aspect of the present disclosure relates to a computing system and/or a method performed by the computing system. The computing system may comprise a communication interface and at least one processing circuit. The communication interface may be configured to communicate with a robot having a robot arm that includes a plurality of arm segments which are movably connected to each other at a plurality of joints. The at least one processing circuit may be configured, when the computing system is in communication with the robot, to perform the method, such as by executing instructions on a non-transitory computer-readable medium. The method may include selecting at least one of: (i) a first joint from among the plurality of joints, or (ii) a first arm segment from among the plurality of arm segments, wherein the first joint connects the first arm segment to a second arm segment that is immediately adjacent to the first arm segment. The method further includes outputting a set of one or more movement commands for causing robot arm movement that includes relative movement between the first arm segment and the second arm segment via the first joint. The method may further include receiving a set of actuation data and a set of movement data associated with the first joint or the first arm segment. The set of actuation data may be sensor data indicative of overall torque or overall force at the first joint in a time period during which the relative movement between the first arm segment and the second arm segment is occurring. The set of movement data may be sensor data indicative of an amount or rate of the relative movement between the first arm segment and the second arm segment during the time period. The method may further include determining, based on the set of actuation data and the set of movement data, at least one of: (i) a friction parameter estimate associated with friction between the first arm segment and the second arm segment, or (ii) a center of mass (CoM) estimate associated with the first arm segment.

DETAILED DESCRIPTION OF THE FIGURES

Figure 1A:
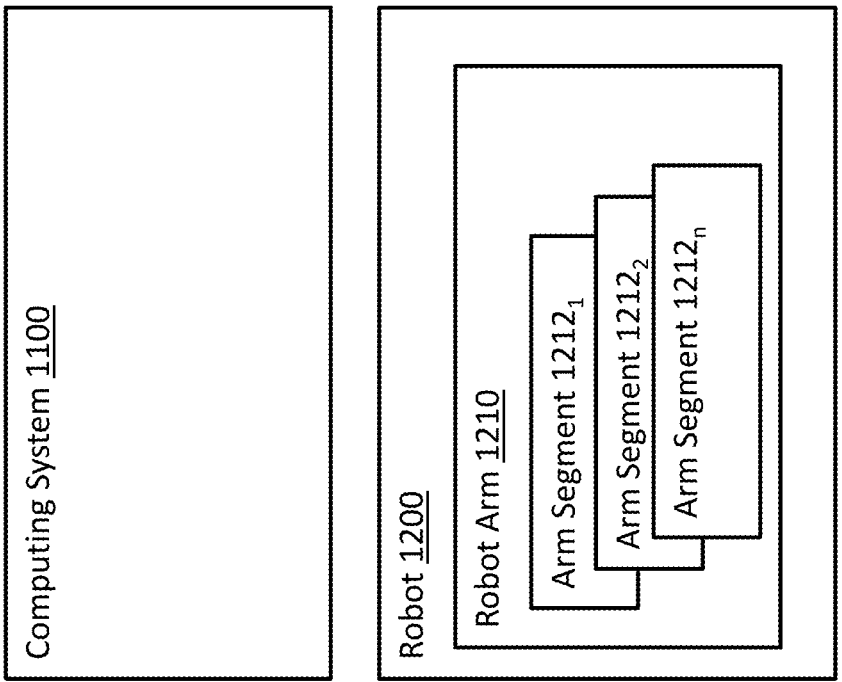
FIGS. 1A-1C illustrate a system for performing robot calibration, consistent with embodiments hereof.

One aspect of the present disclosure relates to estimating a property of a robot, which may be performed as part of a robot calibration operation. In some scenarios, the robot may be located in, e.g., a warehouse or factory, and may be used to pick up or otherwise interact with objects in that environment. The robot calibration operation may involve estimating a parameter which describes a physical property of the robot, such as friction between components of the robot, or a location of a center of mass (CoM) of a component of the robot. In some scenarios, the values of these physical properties may deviate from nominal or theoretical values provided by a manufacturer of the robot. The deviation may arise from a variety of factors, such as manufacturing tolerance, aging, temperature change, or some other factor.

In an embodiment, the robot calibration operation may involve actuating one or more components of the robot so as to cause their movement. Sensor data that describe the movement may be generated, which may be used to perform the robot calibration operation. In some instances, the components of the robot may be, e.g., arm segments of a robot arm. In some implementations, the robot calibration may be performed so as to facilitate more accurate or precise control of the robot arm. The robot calibration operation may be used to, e.g., plan or execute a trajectory for the robot arm. For instance, motor signals or other movement commands may be generated in a manner that accounts for physical properties of the robot arm, which may have been determined from the robot calibration operation.

In an embodiment, the robot calibration operation may be performed on a component-by-component basis. For instance, if the robot arm discussed above includes multiple arm segments that are connected at a plurality of joints, the robot calibration operation may be performed on a joint-by-joint basis or a segment-by-segment basis. Such a manner of performing the robot calibration operation may involve directly actuating only one joint or only one arm segment at a time or, more generally, causing motion of only one joint at a time or only one arm segment at a time. Such a manner of robot calibration may reduce an amount of movement or range of movement during the robot calibration operation, which may better accommodate environments that have tight space constraints. Further, such a manner of robot calibration may also enhance an accuracy of robot calibration, by avoiding simultaneous movement of multiple joints or multiple arm segments, because the simultaneous movement of multiple arm segments or multiple joints is more likely to generate vibrations that can introduce measurement noise into sensor data used for the robot calibration.

In an embodiment, performing the robot calibration may involve using a first movement profile that may generate sensor data which is more optimal for estimating friction, and using a second speed profile that may generate sensor data which is more optimal for estimating center of mass (CoM). For example, the first movement profile may attempt to cause a speed of the resulting movement to have a broad range of values, which may benefit the determination of a friction parameter estimate, such as an estimate for a coefficient of viscous friction. In this example, the second movement profile may attempt to limit a speed or acceleration of the resulting movement, which may limit an amount of measurement noise that is introduced into the sensor data.

In an embodiment, if the robot arm includes a plurality of arm segments connected in series, estimating a center of mass (CoM) for one arm segment may involve removing or otherwise compensating for an influence on the arm segment from one or more downstream arm segments. In some instances, performing the robot calibration operation may involve determining a respective CoM estimate for a furthest downstream arm segment before determining a respective CoM estimate for any other arm segment. In such instances, the robot calibration operation may then proceed in an upstream direction to determine a CoM estimate of an upstream arm segment. Thus, when a CoM estimate for an arm segment is being determined, information regarding a CoM of downstream arm segments may already be available, which may allow for an influence from the downstream arm segments to be removed or accounted for.

Figure 1B:
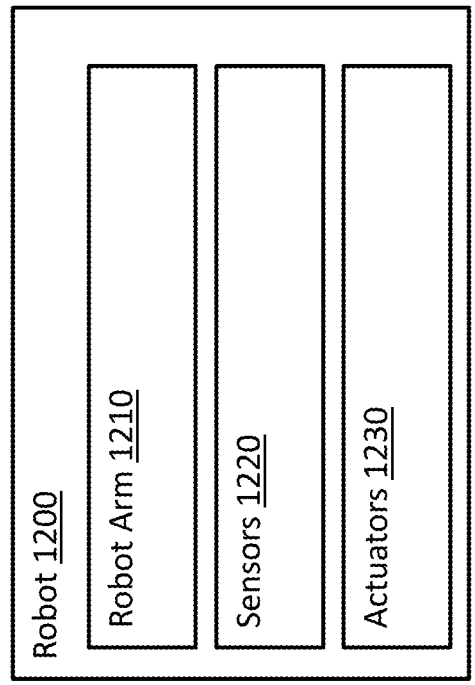
Figure 1C:
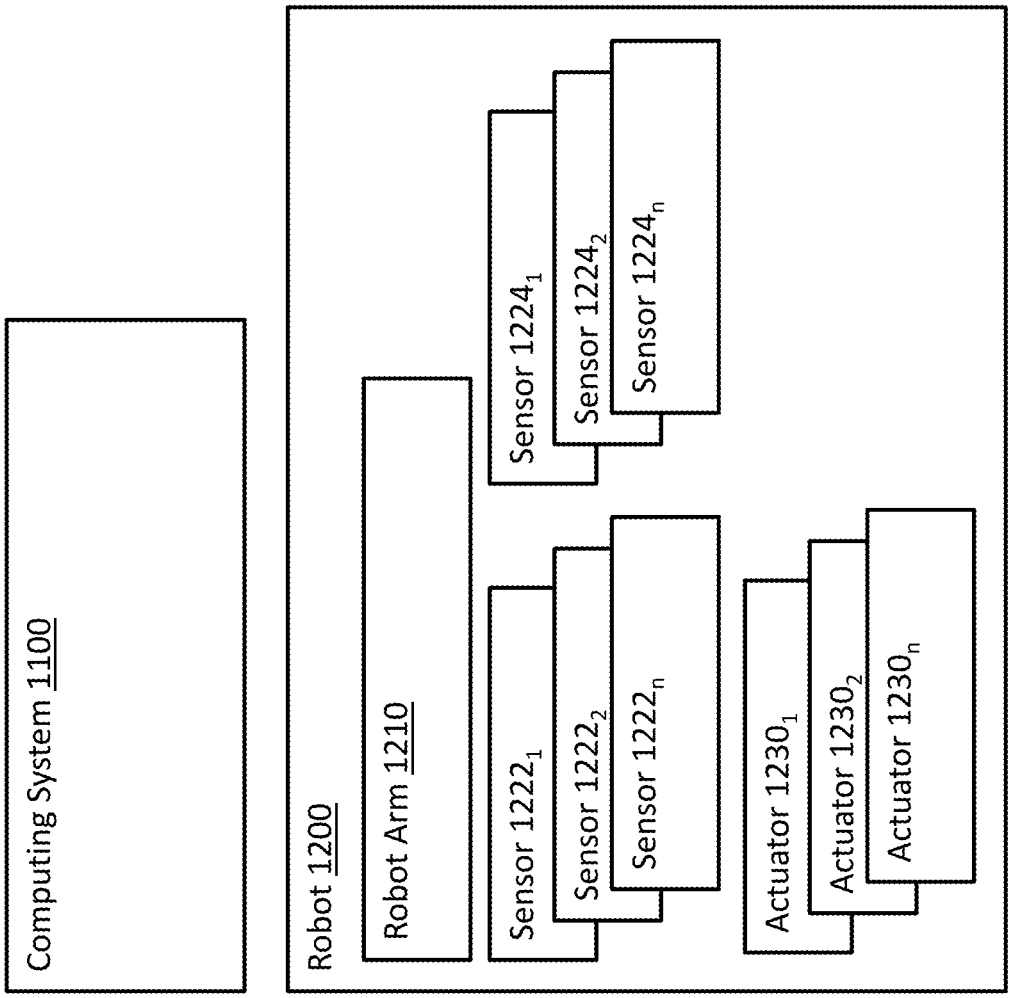

FIGS. 1A, 1B, and 1C illustrate a system 1000 for determining information which estimates or otherwise describes a physical property or physical properties of a robot, or more specifically for performing robot calibration. One skilled in the art will realize that FIGS. 1A-1C illustrate one example of a system 1000 that is used to perform robot calibration, and that components illustrated in FIGS. 1A-1C may be removed or omitted, and/or additional components may be added to the system 1000. As illustrated in FIG. 1A, the system 1000 may include a computing system 1100 and a robot 1200. In an embodiment, the system 1000 may be a robot calibration system or a component thereof, wherein the robot calibration system is configured to perform robot calibration, which may involve, e.g., determining one or more physical properties or some other property of the robot 1200. The robot calibration may be performed, e.g., so as to enhance a level of accuracy by which robot movement (also referred to as robot motion) of the robot 1200 may be controlled, or more specifically to enhance an ability to plan and/or accurately execute a trajectory for the robot 1200.

In some instances, the computing system 1100 may determine the one or more physical properties of the robot 1200, and/or may use the one or more physical properties of the robot 1200 to generate movement commands for causing the robot 1200 to output movement (also referred to as motion) according to a planned trajectory. For example, the computing system 1100 may be configured to determine movement commands (e.g., motor commands) which are specific to or otherwise take into account the one or more physical properties of the robot 1200. As an example, the one or more physical properties may include, e.g., friction between components of the robot 1200 (e.g., arm segments of a robot arm), respective locations at which those components have their center of mass (CoM), respective values for mass or moment of inertia of those components, and/or some other physical property. These properties of the robot may constrain or otherwise affect motion of the robot 1200, and/or affect how components of the robot 1200 should be actuated.

In some instances, the properties that are estimated by system 1000 may be utilized to describe physics (e.g., kinematics) of the motion of the robot 1200, such as by describing how one or more components of the robot 1200 responds to a force, torque, or other form of actuation. If the computing system 1100 of FIG. 1A or another computing system is used to control movement of the robot 1200, the movement may be controlled based on the properties that are estimated. For instance, a motor or other actuator may output a force or torque to initiate or adjust motion of a component of the robot 1200 (e.g., linear motion or rotational motion), but the motion may be affected by factors such as a force due to friction (which may resist the motion or a change in the motion), a force due to gravity, and/or an inertial element such as mass or moment of inertia of the component (which may also resist the motion or a change in the motion). In this example, controlling motion for the component of the robot may involve compensating for the above factors, or more generally taking them into account, when determining, e.g., magnitude values, direction, and/or duration of a force or torque to be output by an actuator used to drive the component of the robot. The motion control may be used to, e.g., execute a trajectory by the robot 1200, which in some scenarios may involve precisely following planned values for position, velocity or speed, and/or acceleration for various components of the robot. That is, the motion control may involve following a planned trajectory, which may involve a specific value or set of values for velocity and/or acceleration of various components of the robot. The estimates of the physical properties discussed above may be used to control the actuators so as to cause the executed trajectory to closely match the planned trajectory.

In an embodiment, performing the robot calibration may involve determining or updating a force model and/or torque model. In such an embodiment, the computing system 1100 (or some other computing system) may determine how much force and/or torque to be applied by an actuator(s), or a direction or duration of the force and/or torque, based on the force model and/or torque model. In some instances, the force model and/or torque model may be formed by or may include information that describes factors which influence an overall force or overall torque on the robot 1200 or a component thereof. For example, the force model and/or torque model may include values for parameters that represent, e.g., friction, gravity, mass, moment of inertia, and/or a combination thereof. In some scenarios, the force model and/or torque model may include a friction model, which may include information that describes how much friction will be experienced by the robot or a component thereof. As an example, the friction model may include parameters which represent viscous friction (also referred to as dynamic friction or sliding friction) and coulomb friction (also referred to as static friction), which are discussed below in more detail. In some situations, the force model and/or torque model may describe a relationship (e.g., mathematical relationship) between a force and/or torque output by an actuator(s) and an overall torque or overall force experienced by the component of the robot, and/or may describe a relationship between the force and/or torque output by the actuator(s) and resulting motion of the component of the robot. In the above example, if the robot calibration results in a force model or torque model, the computing system 1100 (or some other computing system) may utilize the force model and/or torque model to control the actuator(s), or more generally to control motion of the robot 1200.

As stated above, the system 1000 of FIG. 1A may be used to perform robot calibration, such as by determining information which describes or otherwise represents a physical property or properties of the robot 1200. In some instances, the system 1000 (and associated methods performed by the system 1000) operates to perform robot calibration by causing movement of the robot 1200, and using data which describes the movement to determine the physical properties of the robot. More particularly, during the movement, the computing system 1100 may monitor the robot 1200 and receives sensor data which describes the movement of a component of the robot 1200. Based on the received sensor data, the computing system 1100 may determine a respective value for each of the physical properties of the robot 1200 or a component thereof.

In an embodiment, the robot 1200 may include a robot arm 1210, and performing robot calibration may involve determining a physical property or physical properties for components (e.g., arm segments) of the robot arm 1210. More particularly, the robot arm 1210 may include a number, n, of arm segments $1212_1$, $1212_2$, . . . $1212_n$ (also referred to as links of the robot arm 1210), and the physical property or properties determined from robot calibration may describe one or more of the arm segments $1212_1$-$1212_n$. In some instances, each of the arm segments $1212_1$-$1212_n$ may be independently actuatable or moveable in multiple planes of motion. In some implementations, the arm segments $1212_1$-$1212_n$ may be coupled to each other in series (e.g., via a plurality of joints), such that the robot arm 1210 is formed from a series of the arm segments $1212_1$-$1212_n$. In this embodiment, the arm segments $1212_1$-$1212_n$ may form a kinematic chain for moving an end effector or other arm segment to a particular pose. For instance, the arm segments $1212_1$-$1212_n$ may be coupled such that each of the arm segments $1212_1$-$1212_n$ has a first end (e.g., proximal end) which is coupled to a robot base or to a preceding arm segment in the series of arm segments $1212_1$-$1212_n$, and has a second end (e.g., distal end) that is coupled to a following arm segment in the series of arm segments $1212_1$-$1212_n$, or forms a distal end of the robot arm 1210. In this manner, the arm segment $1212_1$ may be followed by the arm segment $1212_2$, which may be followed by the arm segment $1212_3$, which may be followed by the arm segment $1212_4$, etc. As an example, the arm segment $1212_1$ may be coupled to the robot base at a proximal end of the arm segment $1212_1$ and may be coupled to arm segment $1212_2$ at a distal end of the arm segment $1212_1$. Further in this example, the arm segment $1212_2$ may be coupled to the arm segment $1212_1$ at a proximal end of the arm segment $1212_2$, and may be coupled to the arm segment $1212_3$ at a distal end of the arm segment $1212_2$. One skilled in the art will realize that the arms segments $1212_1$-$1212_n$ may be coupled in any arrangement in order to perform movements according to operational requirements of the robot 1200. In some implementations, the arm segment $1212_n$ may be the end effector apparatus.

In an embodiment, if the robot calibration involves determining information regarding a physical property of the arm segments $1212_1$-$1212_n$ of the robot arm 1210, the information may be used to control movement of the robot arm 1210. For instance, the arm segments $1212_1$-$1212_n$ may be movable relative to one another to produce an overall motion of the robot arm 1210 to achieve a desired pose for an end effector or other arm segment at a distal end of the robot arm 1210. If the computing system 1100 is involved in controlling movement of the robot arm 1210, such as by planning a trajectory for the robot arm 1210, the computing system 1100 may plan movement of individual arm segments. This planning of movement for the individual arm segments may be based on the determined information regarding a physical property of the individual arm segments. In some instances, the robot calibration may involve determining a force model and/or torque model that describes factors which affect how much overall force or overall torque is exerted on the individual arm segments. For example, the force model and/or torque model may apply to an arm segment or a joint connecting a pair of arm segments, and may describe a relationship between an overall force or overall torque experienced by the arm segment or the joint and an amount or rate of movement by the arm segment relative to the joint. In such instances, the computing system 1100 may plan movement of the individual arm segments based on the force model and/or torque model.

In an embodiment, if performing the robot calibration involves determining information regarding a physical property for each arm segment of the arm segments $1212_1$-$1212_n$ of the robot arm 1210, the physical property may involve a parameter which describes a relationship between movement of the arm segment and torque or force directly applied to the arm segment. For example, the parameter may describe, for each of the arm segments $1212_1$-$1212_n$, a location of a center of mass of the arm segment, mass or weight of the arm segment, how mass of the arm segment is distributed, a moment of inertia of the arm segment, and/or friction between the arm segment and another component (e.g., another arm segment) of the robot arm 1210. The parameter may be used by the computing system 1100 or any other computing system when planning a trajectory for the robot arm 1210. For instance, the computing system 1100 may use the parameter to predict how much movement or a rate of movement will be produced by a particular amount of force or torque, or to determine how much force or torque is needed to generate a certain amount of movement or rate of movement. More particularly, the computing system 1100 may use the parameter to determine an amount of force or torque which compensates for an effect of friction on an arm segment, an effect of gravity on the arm segment (which may be approximated as acting on the CoM of the arm segment), and/or mass or moment of inertia of the arm segment.

In an embodiment, as illustrated in FIG. 1B, the robot 1200 may include a set 1220 of one or more sensors and a set 1230 of one or more actuators (e.g., motors), which may be used to perform the robot calibration operation. The set 1230 of one or more actuators may each be configured to output a force or a torque, which may be applied to one or more of the arm segments $1212_1$-$1212_n$ of the robot arm 1210 so as to cause movement of the one or more arm segments. In an embodiment, the operation of the set 1230 of one or more actuators may be controlled by the computing system 1100. For instance, the computing system 1100 may be configured to output one or more movement commands for causing activation of at least one actuator of the set 1230 of one or more actuators. In some implementations, the one or more movement commands may include an analog and/or digital signal for causing the set 1230 of one or more actuators to activate and output a force and/or torque. The one or more movement commands may in some instances control how much force or torque is output by the activated actuator, a direction of the force or torque, and/or a duration of the force or torque.

In an embodiment, as illustrated in FIG. 1C, the set 1230 of one or more actuators may include a plurality of actuators $1230_1$-$1230_n$, each of which may output a force or torque for causing movement of a respective arm segment of the plurality of arm segments $1212_1$-$1212_n$. For instance, the multiple actuators $1230_1$-$1230_n$ may be configured to output torque for rotating or otherwise moving the arm segments $1212_1$-$1212_n$. In one example, the actuators $1230_1$-$1230_n$ may be coupled to or disposed at the arm segments $1212_1$-$1212_n$, and may output respective forces or torques when activated to cause movement of the arm segments $1212_1$-$1212_n$, respectively. In such an example, activation of the actuators $1230_1$-$1230_n$ and/or respective amounts of force or torque output by the actuators $1230_1$-$1230_n$ may be controlled by the computing system 1100 (e.g., via movement commands).

In an embodiment, the set 1220 of one or more sensors are configured to generate one or more sets of sensor data (also referred to as data sets) that are used by the computing system 1100 to perform robot calibration. In some scenarios, the data sets may measure or otherwise represent the movement of the one or more of the arm segments $1212_1$-$1212_n$ and/or a force or torque experienced by the arm segments $1212_1$-$1212_n$. For example, one or more data sets for the sensor data may include a set of actuation data and a set of movement data.

In an embodiment, the set of actuation data may include data that represents overall force and/or overall torque experienced by one or more of the arm segments $1212_1$-$1212_n$. The overall force or overall torque on an arm segment may include or be based on forces or torques due to a contribution by the actuators $1230_1$-$1230_n$, forces or torques due to a contribution from gravity, and forces or torques due to a contribution from friction.

In an embodiment, the set of movement data for one of the arm segments $1212_1$-$1212_n$ may include data that represents an amount of movement or rate of movement (e.g., velocity or acceleration) of the arm segment. The movement may be, e.g., rotation of an arm segment, linear movement of the arm segment, or some other movement. In some instances, the amount of movement or rate of movement may be measured relative to another component of the robot 1200, such as another arm segment. For instance, a position of this other arm segment may be treated as a baseline position (or, more generally, a reference frame) from which the amount of movement or rate of movement of the moving arm segment is measured. In some instances, the amount of movement may be represented by a position or displacement of the moving arm segment, which may be relative to, e.g., the baseline position discussed above. If the movement involves rotation of one arm segment relative to the baseline position, the position or displacement may also be referred to as a rotational position, rotational displacement, or angular displacement, and may be measured in degrees or radians. In some instances, a positive value for the rotational position may indicate that the moving arm segment has rotated in one direction (e.g., counterclockwise direction) past the baseline position, while a negative value for the rotational position may indicate that the moving arm segment has rotated in an opposite direction (e.g., clockwise direction) past the baseline position.

In an embodiment, the set 1220 of one or more sensors may include a first set of sensors $1222_1$, $1222_2$, . . . $1222_n$ for generating the actuation data and a second set of sensors $1224_1$, $1224_2$, . . . $1224_n$ for generating the movement data, as illustrated in FIG. 1C. In some implementations, the first set of sensors $1222_1$-$1222_n$ may be disposed at or otherwise corresponds with the arm segments $1212_1$-$1212_n$. Similarly, the second set of sensors $1224_1$-$1224_n$ may also be disposed at or otherwise corresponds with the arm segments $1212_1$-$1212_n$. In this example, each of the first set of sensors $1222_1$-$1222_n$ may generate a respective set of actuation data which is indicative of force or torque at a respective arm segment of the plurality of arm segments $1212_1$-$1212_n$. Further, each of the second set of sensors $1224_1$-$1224_n$ may generative a respective set of movement data which is indicative of an amount or rate of movement of a respective arm segment of the plurality of arm segments $1212_1$-$1212_n$. In some implementations, the arm segments $1212_1$-$1212_n$ are driven or otherwise actuated by the actuators $1230_1$-$1230_n$, and each sensor of the first set of sensors $1222_1$-$1222_n$ may be a torque sensor or an electrical current sensor that corresponds to a respective actuator of the plurality of actuators $1230_1$-$1230_n$. If the each of the sensors $1222_1$-$1222_n$ is an electrical current sensor, the sensor may be configured to measure a respective amount of electrical current flowing through the sensor, which may be substantially equal to a respective amount of electrical current flowing through a respective actuator of the plurality of actuators $1230_1$-$1230_n$. The amount of electrical current flowing through the actuator may be used to calculate or otherwise determine an amount of overall force or overall torque experienced by a corresponding arm segment. This calculation may be performed by the computing system 1100, or by the sensors $1222_1$-$1222_n$ themselves.

Figure 2A:
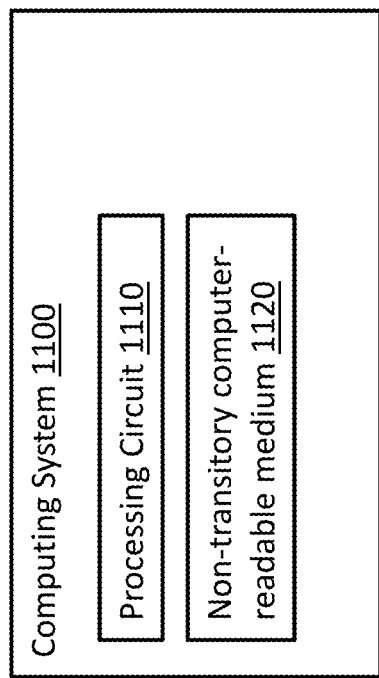
FIGS. 2A-2C provide block diagrams that illustrate a computing system for performing robot calibration, consistent with embodiments hereof.

FIG. 2A provides a block diagram that illustrates an embodiment of the computing system 1100. The computing system 1100 includes at least one processing circuit 1110 and a non-transitory computer-readable medium (or media) 1120. In an embodiment, the processing circuit 1110 includes one or more processors, one or more processing cores, a programmable logic controller ("PLC"), an application specific integrated circuit ("ASIC"), a programmable gate array ("PGA"), a field programmable gate array ("FPGA"), any combination thereof, or any other processing circuit. In an embodiment, the non-transitory computer-readable medium 1120 may be a storage device, such as an electronic storage device, a magnetic storage device, an optical storage device, an electromagnetic storage device, a semiconductor storage device, or any suitable combination thereof, for example, such as a computer diskette, a hard disk drive (HDD), a solid state drive (SSD), a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, any combination thereof, or any other storage device. In some instances, the non-transitory computer-readable medium 1120 may include multiple storage devices. The non-transitory computer-readable medium 1120 may alternatively or additionally store computer readable program instructions that, when executed by the processing circuit 1110, causes the processing circuit 1110 to perform one or more methods described herein, such as the operations described with respect to method 4000 illustrated in FIG. 4.

Figure 2B:
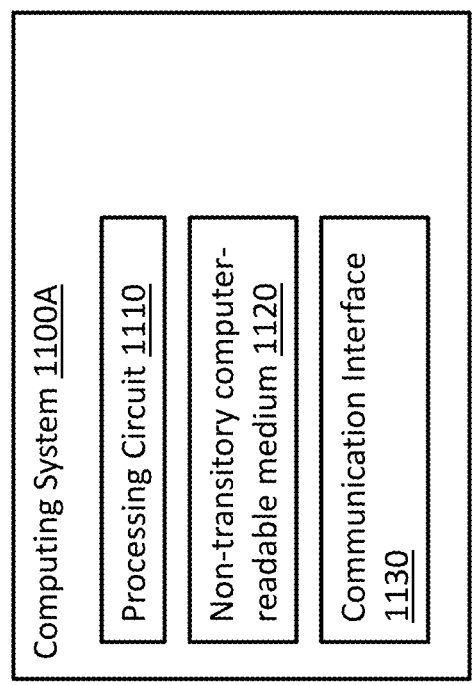

FIG. 2B depicts a computing system 1100A that is an embodiment of the computing system 1100 and that includes a communication interface 1130. The communication interface 1130 may be configured to provide a wired or wireless communication pathway between the computing system 1100A and the robot 1200, such as with the sensors (e.g., 1220) and/or actuators (e.g., 1230) discussed above. As an example, the communication circuit may include a RS-232 port controller, a USB controller, an Ethernet controller, a Bluetooth® controller, a PCI bus controller, a network controller, any other communication circuit, or a combination thereof. If the computing system 1100A generates one or more movement commands, the communication interface 1130 may be configured to communicate the one or more movement commands to the set 1230 of actuators. Further, if the set 1220 of sensors generate sensor data, the communication interface 1130 may be configured to receive the sensor data (e.g., movement data and actuation data) from the set 1220 of sensors. In such a situation, the processing circuit 1110 of the computing system 1100 may be configured to directly or indirectly receive the sensor data via the communication interface 1130.

Figure 2C:
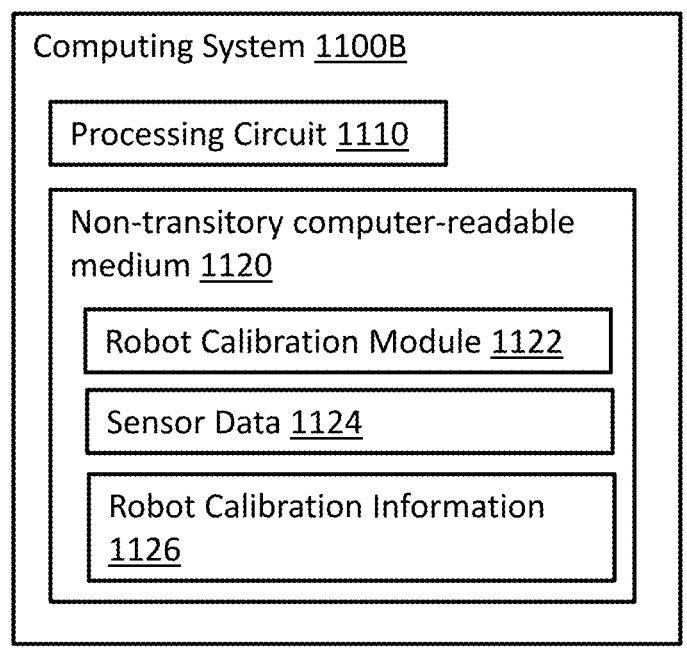

In an embodiment, the processing circuit 1110 may be programmed by one or more computer-readable program instructions stored on the non-transitory computer-readable medium 1120. For example, FIG. 2C illustrates a computing system 1100B, which is an embodiment of the computing system 1100/1100A, in which the processing circuit 1110 is programmed by one or more modules, including a robot calibration module 1122, which may include computer-readable program instructions for performing robot calibration. In various embodiments, the terms "computer-readable instructions" and "computer-readable program instructions" are used to describe software instructions or computer code configured to carry out various tasks and operations. In various embodiments, the term "module" refers broadly to a collection of software instructions or code configured to cause the processing circuit 1110 to perform one or more functional tasks. The modules and computer-readable instructions may be described as performing various operations or tasks when a processing circuit or other hardware component is executing the modules or computer-readable instructions.

In an embodiment, as illustrated in FIG. 2C, the non-transitory computer-readable medium 1120 may store or otherwise include sensor data 1124, which may be used by the processing circuit 1110 to perform robot calibration. The sensor data 1124 may include, e.g., the actuation data and the movement data described above. In some scenarios, the sensor data 1124 may have been generated by the set 1220 of sensors of FIG. 1B, and may have been received via the communication interface 1130 of FIG. 2B. If the stored sensor data 1124 is used to perform a robot calibration operation, the non-transitory computer-readable medium 1120 may further store robot information 1126 that is determined as a result of the robot calibration operation (also referred to as robot calibration information 1126). The robot calibration information 1126 may describe a physical property or physical properties of a robot (e.g., 1200). For example, the robot calibration information may include respective estimates (also referred to as estimated values) for various parameters which describe the physical property or physical properties of the robot. In some instances, the robot calibration information may describe a torque model, a force model, and/or a friction model.

Figure 3A:
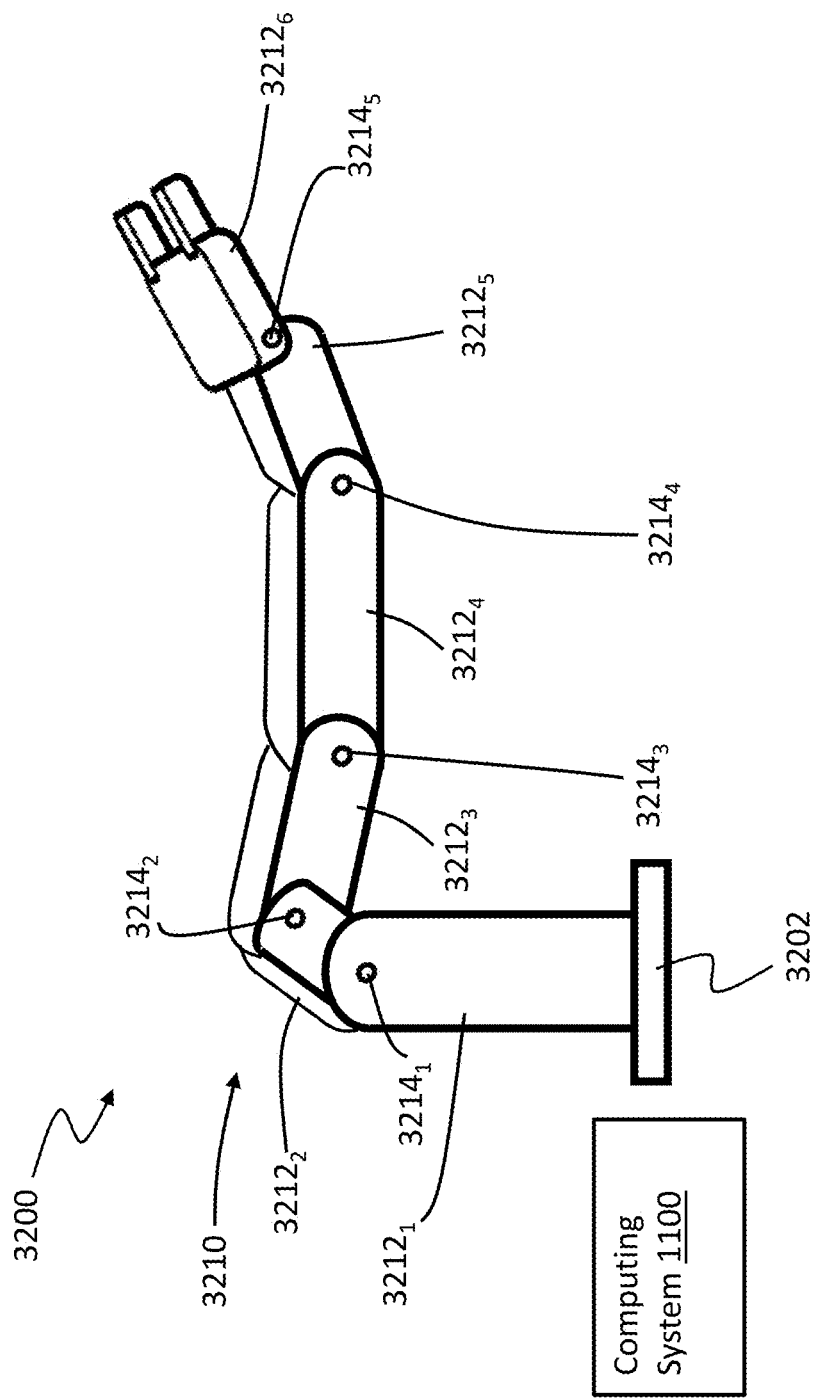
FIGS. 3A-3E illustrate an environment in which robot calibration may be performed, consistent with an embodiment hereof.

FIGS. 3A-3D illustrate an example environment(s) in which robot calibration may be performed according to various embodiments. One skilled in the art will realize that FIGS. 3A-3D illustrate one example of an environment(s) for performing robot calibration, and that existing components illustrated in FIGS. 3A-3D may be removed and/or additional components may be added to the environment. FIG. 3A presents a side view of a robot 3200, which may be an embodiment of the robot 1200. The robot 3200 may include a robot arm 3210 that is coupled to a base 3202. In the example of FIG. 3A, the robot arm 3210 may include a plurality of arm segments $3212_1$, $3212_2$, $3212_3$, $3212_4$, $3212_5$, and $3212_6$ (also referred to as links), which may be coupled at a plurality of joints $3214_1$, $3214_2$, $3214_3$, $3214_4$, $3214_5$. In the example of FIG. 3A, the arm segments $3212_1$-$3212_6$ may be connected as a series of arm segments, which may extend in a downstream direction, which may be a direction away from the base 3202. In this example, the arm segment $3212_6$ which is furthest downstream along the robot arm 3210 may be an end effector apparatus (e.g., a robot gripper), and may form a distal end of the robot arm 3210. That is, the arm segment $3212_6$ may be the most distal arm segment of the robot arm 3210, relative to the robot base 3202.

In an embodiment, the joints $3214_1$-$3214_5$ may directly couple respective pairs of immediately adjacent arm segments. For example, the arm segment $3212_1$ is coupled to the arm segment $3212_2$ at a joint $3214_1$. In this example, the arm segment $3212_1$ and the arm segment $3212_2$ may be considered to be immediately adjacent to each other because they are directly coupled to each other via the joint $3214_1$. The joint $3214_1$ may allow relative movement between the pair of arm segments $3212_1$, $3212_2$. In one example, the joint $3214_1$ may be a revolute joint (or, more generally, a pivot point) that allows relative rotation between the pair of arm segments $3212_1$, $3212_2$, or more particularly allows the arm segment $3212_2$ to rotate relative to the arm segment $3212_1$. In this example, the other joints $3214_2$ through $3214_5$ may each be a revolute joint that directly connects a respective pair of immediately adjacent arm segments, and that permits relative rotation between the pair of arm segments. For instance, the joint $3214_5$ may directly connect arm segment $3212_5$ and arm segment $3212_6$, and permit the arm segment $3212_6$ to rotate relative to the arm segment $3212_5$. In another example, the robot arm 3210 may additionally or alternatively have prismatic joints which permit relative linear motion (also referred to as relative lateral motion) between a pair of immediately adjacent arm segments.

As stated above, the arm segments $3212_1$-$3212_6$ may be connected as a series of arm segments, which may extend in a downstream direction, from the arm segment $3212_1$ to the arm segment $3212_6$. The arm segment $3212_1$ may be closest (also referred to as being most proximal) to the robot base 3202, while the arm segment $3212_6$ may be the furthest (i.e., also referred to as being the most distal) from the robot base 3202. The series of arm segments $3212_1$ through $3212_6$ may form a kinematic chain in which movement of one arm segment (e.g., $3212_3$) causes movement of downstream arm segments (e.g., $3212_4$, $3212_5$, $3212_6$). The series connection of the arm segments $3212_1$-$3212_6$ may further define a proximal end or proximal direction and a distal end or distal direction. For example, each of the arm segments $3212_1$-$3212_6$ may have a respective proximal end and a respective distal end. The proximal end may be closer to the robot base 3202, while the distal end may be further downstream, such that it is farther from the robot base 3202. As an example, the arm segment $3212_3$ may have a proximal end that is directly connected to the arm segment $3212_2$, and may have a distal end that is directly connected to the arm segment $3212_4$. Further, if an arm segment (e.g., $3212_4$, $3212_5$, or $3212_6$) is directly or indirectly connected to the distal end of another arm segment (e.g., $3212_3$), the former arm segment (e.g., $3212_4$, $3212_5$, or $3212_6$) may be considered distal to the latter arm segment (e.g., $3212_3$). Conversely, if an arm segment (e.g., $3212_3$, $3212_4$, $3212_5$) is directly or indirectly connected to a proximal end of another arm segment (e.g., $3212_6$), the former arm segment (e.g., $3212_3$, $3212_4$, $3212_5$) may be considered proximal to the latter arm segment (e.g., $3212_6$). As another example, the arm segment $3212_3$ may be considered a distal arm segment relative to the arm segment $3212_2$ and relative to the arm segment $3212_1$, while the arm segments $3212_1$ and $3212_2$ may be considered proximal arm segments relative to the arm segment $3212_3$.

Figure 3B:
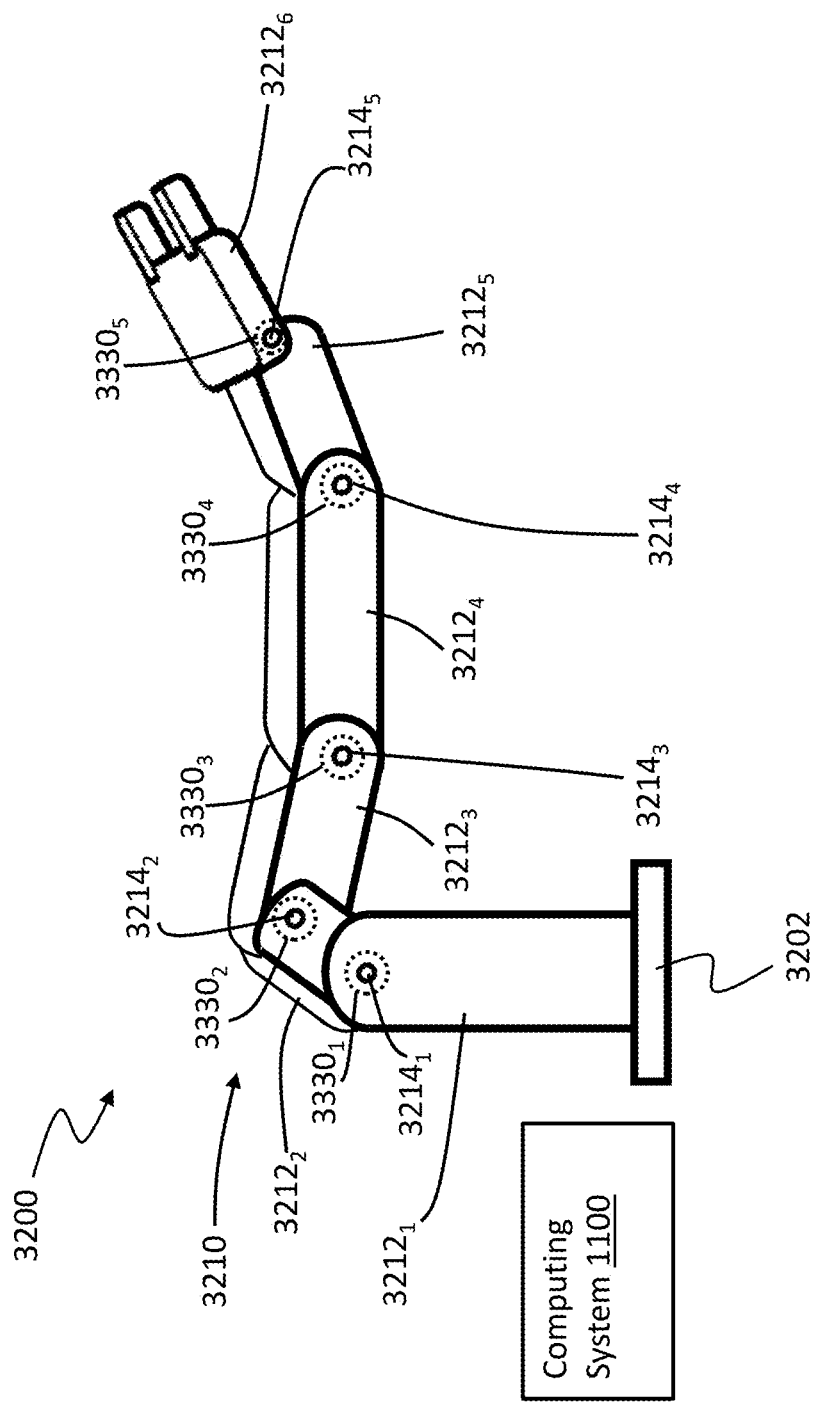

In an embodiment, as illustrated in FIG. 3B, the robot 3200 may include a plurality of actuators $3330_1$, $3330_2$, $3330_3$, $3330_4$, and $3330_5$ (which may be embodiments of the actuators $1230_1$ through $1230_n$) for causing movement of the respective arm segments $3212_2$-$3212_6$, or more specifically for causing relative movement between respective pairs of immediately adjacent arm segments. In some instances, the plurality of actuators $3330_1$ through $3330_5$ may be disposed at or near the joints $3214_1$ through $3214_5$, respectively. In some implementations, the actuators $3330_1$-$3330_5$ may be motors that are disposed around the joints $3214_1$-$3214_5$, and may output torque or force at the joints $3214_1$-$3214_5$. The actuators $3330_1$ through $3330_5$ may each output a respective force or torque for moving a respective one of the arm segments $3212_2$-$3212_6$ relative to an adjacent arm segment (or relative to some other reference frame). As an example, the actuator $3330_3$ may be disposed at or near the joint $3214_3$, which directly connects a pair of arm segments $3212_3$, $3212_4$. The actuator $3330_3$ may output a torque at the joint $3214_3$, which may cause relative rotation between the pair of arm segments $3212_3$, $3212_4$. More specifically, the torque may cause the more distal arm segment $3212_4$ of the pair of arm segments $3212_3$, $3212_4$ to rotate relative to the more proximal arm segment $3212_3$ of the pair of arm segments. Further, the arm segment $3212_4$ may rotate about the joint $3214_3$. In an embodiment, the actuators $3330_1$-$3330_5$ may include motors (e.g., electrical and/or magnetic motors), pumps (e.g., hydraulic pumps or pneumatic pumps), some other actuators, or a combination thereof.

Figure 3C:
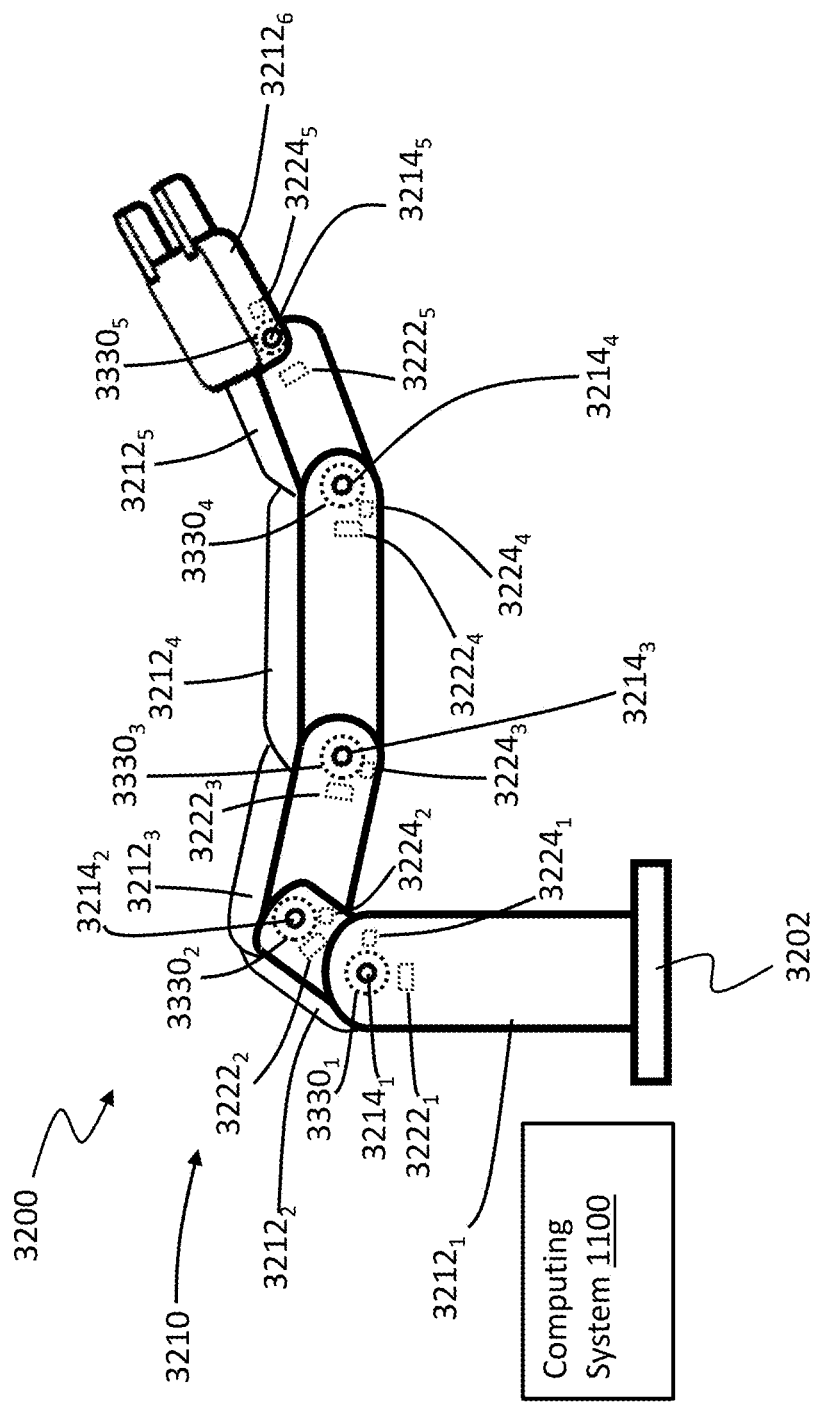

In an embodiment, the robot 3200 may include a set of sensors for generating sensor data which may be used in performing robot calibration. For instance, as illustrated in FIG. 3C, the robot 3200 may include a first set of sensors $3222_1$, $3222_2$, $3222_3$, $3222_4$, and $3222_5$ for generating actuation data and a second set of sensors $3224_1$, $3224_2$, $3224_3$, $3224_4$, and $3224_5$ for generating movement data. More specifically, the first set of sensors $3222_1$-$3222_5$ (which may be an embodiment of the sensors $1222_1$ through $1222_n$) may each be configured to generate a respective set of actuation data that relates to actuation of a respective arm segment of the plurality of arm segments $3212_2$-$3212_6$. More particularly, the set of actuation data for a particular arm segment may measure a parameter indicative of force or torque exerted on or experienced by the arm segment. For instance, the sensor $3222_1$ may generate a first set of actuation data that corresponds to the actuation of the arm segment $3212_2$ relative to the arm segment $3212_1$ (or vice versa), while the sensor $3222_2$ may generate a second set of actuation data that corresponds to the actuation of the arm segment $3212_3$ relative to the arm segment $3212_2$ (or vice versa). As another example, the sensor $3222_3$ may generate a third set of actuation data that corresponds to the actuation of the arm segment $3212_4$ relative to the arm segment $3212_3$ (or vice versa), while the sensor $3222_4$ may generate a fourth set of actuation data that corresponds to the actuation of the arm segment $3212_5$ relative to the arm segment $3212_4$ (or vice versa).

In an embodiment, the sensors $3222_1$-$3222_5$ may be or may include force sensors or torque sensors that are each configured to directly measure an overall force or torque at the joints $3214_1$-$3214_5$, or more specifically the overall force or torque on the arm segments $3212_2$-$3212_6$ connected at those joints. In an embodiment, the sensors $3222_1$-$3222_5$ may include electrical current sensors or voltage sensors configured to measure electrical current or electrical voltage. In one example, the sensors $3222_1$-$3222_5$ may be electrical current sensors that are configured to measure respective amounts of electrical current flowing through the actuators $3330_1$-$3330_5$. In this example, each of the sensors $3222_1$-$3222_5$ may be electrically connected in series with a respective actuator (e.g., motor) of the actuators $3330_1$-$3330_5$. The sensor may measure an amount of electrical current flowing through itself, which may be equal to or substantially equal to an amount of electrical current being provided to, drawn by, or otherwise flowing through the respective actuator. The amount of electrical current flowing through the actuator may be indicative of an overall force or overall torque at a corresponding joint at which the actuator is located. In some instances, the joint, or the arm segment at the joint, may act as a mechanical load being driven by the actuator, and the amount of electrical current flowing through the actuator may depend on how much voltage is being provided to activate the actuator and depend on a characteristic of the mechanical load, such as whether the load is being influenced by a torque other than that provided by the actuator (e.g., a torque caused by gravity), and/or whether motion of the load is being resisted by another torque (e.g., a resistance torque due to friction). As an example, the sensor $3222_4$ may measure an amount of electrical current flowing through the actuator $3330_4$, which may be indicative of an overall force or torque at the joint $3214_4$, or more specifically an overall force or overall torque on the arm segment $3212_5$ or the arm segment $3212_4$ (for rotating the arm segment $3212_5$ and/or $3212_4$ relative to a pivot point provided by the joint $3214_4$).

In some instances, the actuation data generated by the sensors $3222_1$-$3222_5$ may have values equal to how much electrical current is flowing through the corresponding actuators $3330_1$-$3330_5$. In such instances, the computing system 1100 may be configured to calculate or otherwise determine values of overall torque or overall force based on the electrical current values represented by the actuation data. In some instances, the sensors $3222_1$-$3222_5$ themselves may be configured to calculate or otherwise determine the values of overall torque or overall force, and to provide the torque values or force values as part of the actuation data. The calculation may be based on, e.g., a predefined relationship between electrical current and overall torque or overall force, such as a relationship in which the overall torque is equal to or based on a predefined constant (which may be referred to as a torque constant) multiplied by the electrical current. Thus, the computing system 1100 may be configured to perform the above calculation of overall torque by multiplying the torque constant by values of electrical current measured by the sensors $3222_1$-$3222_5$. In some implementations, the computing system 1100 (and/or the sensors $3222_1$-$3222_5$) may have access to stored actuator information that may provide a value for the torque constant. For example, the torque constant may be a value that is stored in the non-transitory computer-readable medium 1120.

As stated above, the second set of sensors $3224_1$-$3224_5$ in FIG. 3C may generate respective sets of movement data. In some implementations, the second set of sensors $3224_1$-$3224_5$ may be disposed at or near the joints $3214_1$-$3214_5$, respectively. The respective sets of movement data generated by the sensors $3214_1$-$3214_5$ may measure or otherwise describe movement of the arm segments $3212_2$-$3212_6$, respectively, or more specifically describe relative movement between respective pairs of arm segments connected by the joints $3214_1$-$3214_5$. For example, the sensor $3224_5$ may measure or otherwise describe movement of the arm segment $3212_6$ relative to the joint $3214_5$ and relative to the arm segment $3212_5$, or more specifically describe relative movement between the pair of immediately adjacent arm segments $3212_6$, $3212_5$, which are directly connected by the joint $3214_5$. In the above example, the arm segment $3212_6$ may be a more distal arm segment of the pair, while the arm segment $3212_5$ may be a more proximal arm segment of the pair. As another example, the sensor $3224_4$ may measure or otherwise describe movement of the arm segment $3212_5$ relative to the joint $3214_4$ and relative to the arm segment $3212_4$.

Figure 3D:
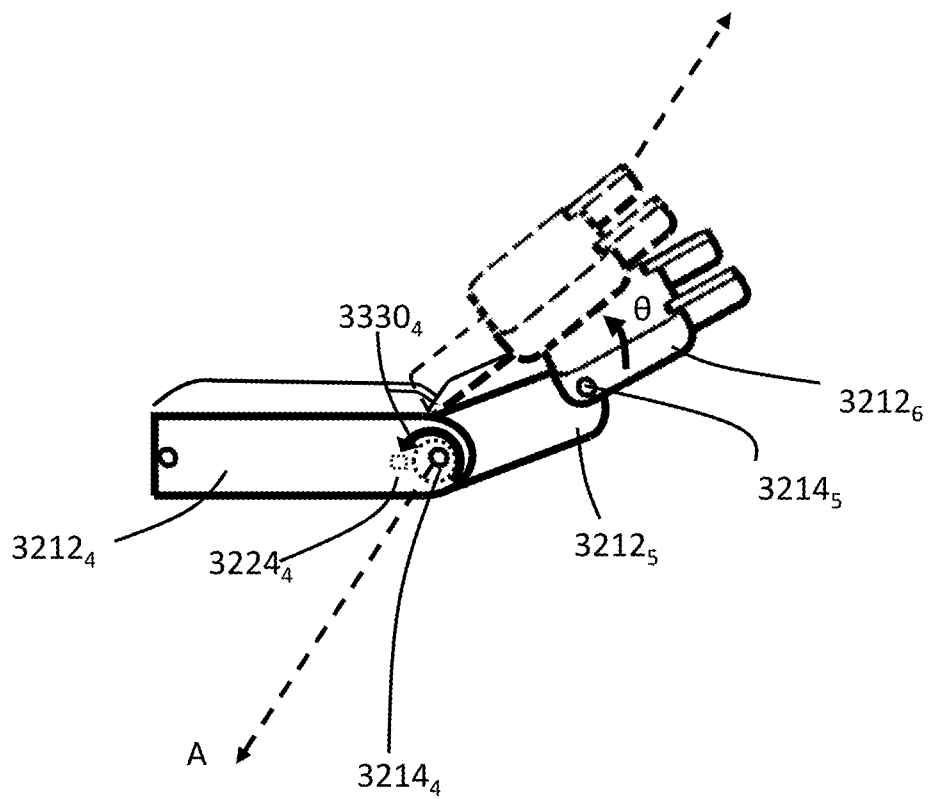
Figure 3E:
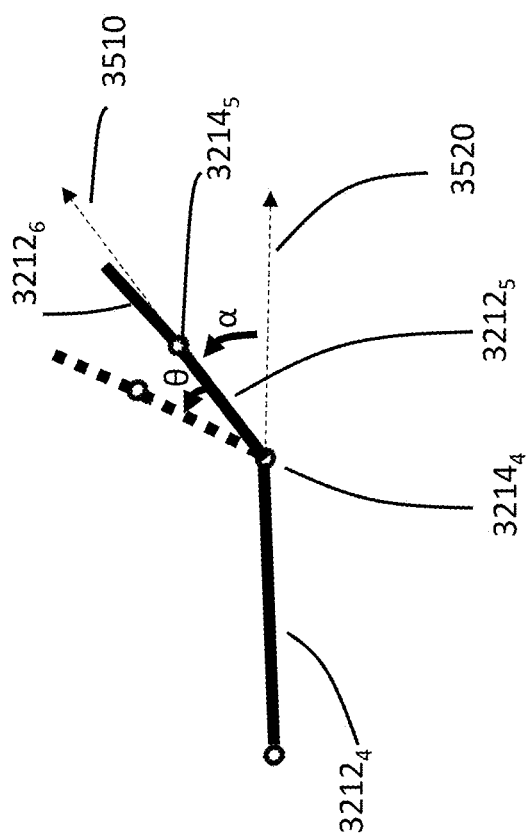

In an embodiment, the movement data may measure or otherwise describe an amount or rate of movement of an arm segment. The amount or rate of movement may be measured relative to a baseline position, such as a position of a joint to which the arm segment is connected, a position of the arm segment before it began moving, a position of a proximal arm segment that is immediately adjacent to the moving arm segment, or some other baseline position (also referred to as a reference position). In some instances, the amount of movement may refer to a position of the arm segment relative to the baseline position. If the movement involves rotation of the arm segment, the amount of movement (or, more specifically, the amount of rotation), may in some instances refer to a rotational position of the arm segment (also referred to as angular position, rotational displacement, or angular displacement). The rotational position of the arm segment may be measured relative to the baseline position. As an example, FIG. 3D illustrates a situation in which the arm segment $3212_5$ rotates relative to the joint $3214_4$ and relative to the arm segment $3212_4$ about a rotational axis A that extends through the joint $3214_4$, wherein the joint $3214_4$ may directly connect the two arm segments. In this example, the rotational position of the arm segment $3212_5$ may be indicated by an angle θ, which measures how much the arm segment $3212_5$ has rotated relative to a baseline position. As stated above, various positions may be used as the baseline position. In one example, as illustrated by a simplified diagram of the arm segments $3212_4$ and $3212_5$ in FIG. 3E, the baseline position may be a position 3510 of the arm segment $3212_5$ (e.g., orientation of the arm segment) when it was stationary relative to the joint $3214_4$ and relative to the arm segment $3212_4$, such that the angle θ for the rotational position may measured from the position 3510. In FIG. 3E, the baseline position 3510 may form an angle α (e.g., nonzero angle) with a horizontal position. More specifically, an orientation associated with the baseline position 3510 may form the angle α with a horizontal orientation, which may be an orientation that is perpendicular to gravity. The angle α is discussed below in more detail.

In an embodiment, the movement data may measure or otherwise describe a rate by which an arm segment (e.g., $3212_5$) is rotating or otherwise moving. The rate of movement may be measured relative to the baseline position discussed above. In some instances, the rate of movement of one arm segment about a joint (e.g., $3214_4$) may be measured relative to that joint, or relative to an immediately adjacent arm segment (e.g., $3212_4$). In some implementations, the rate of movement may refer to a speed, velocity, or acceleration (e.g., rotational speed, rotational velocity, or rotational acceleration). In this example, rotational speed may refer to a magnitude of the rotational velocity, while the rotational velocity may further describe a direction of rotation (e.g., clockwise or counterclockwise). In an embodiment, the computing system 1100 may be configured to determine additional movement data based on movement data generated by the sensors $3224_1$-$3224_5$. For example, if the sensors $3224_1$-$3224_5$ directly measure rotational position, and provides that measurement in the movement data, the computing system 1100 may be configured to determine rotational velocity and/or rotational acceleration based on the rotational position (e.g., as a time-based derivative of the rotational position). In an embodiment, the second set of sensors $3224_1$-$3224_5$ may include angular displacement sensors, linear displacement sensors, other sensors configured to generate movement data, or a combination thereof.

Figure 4:
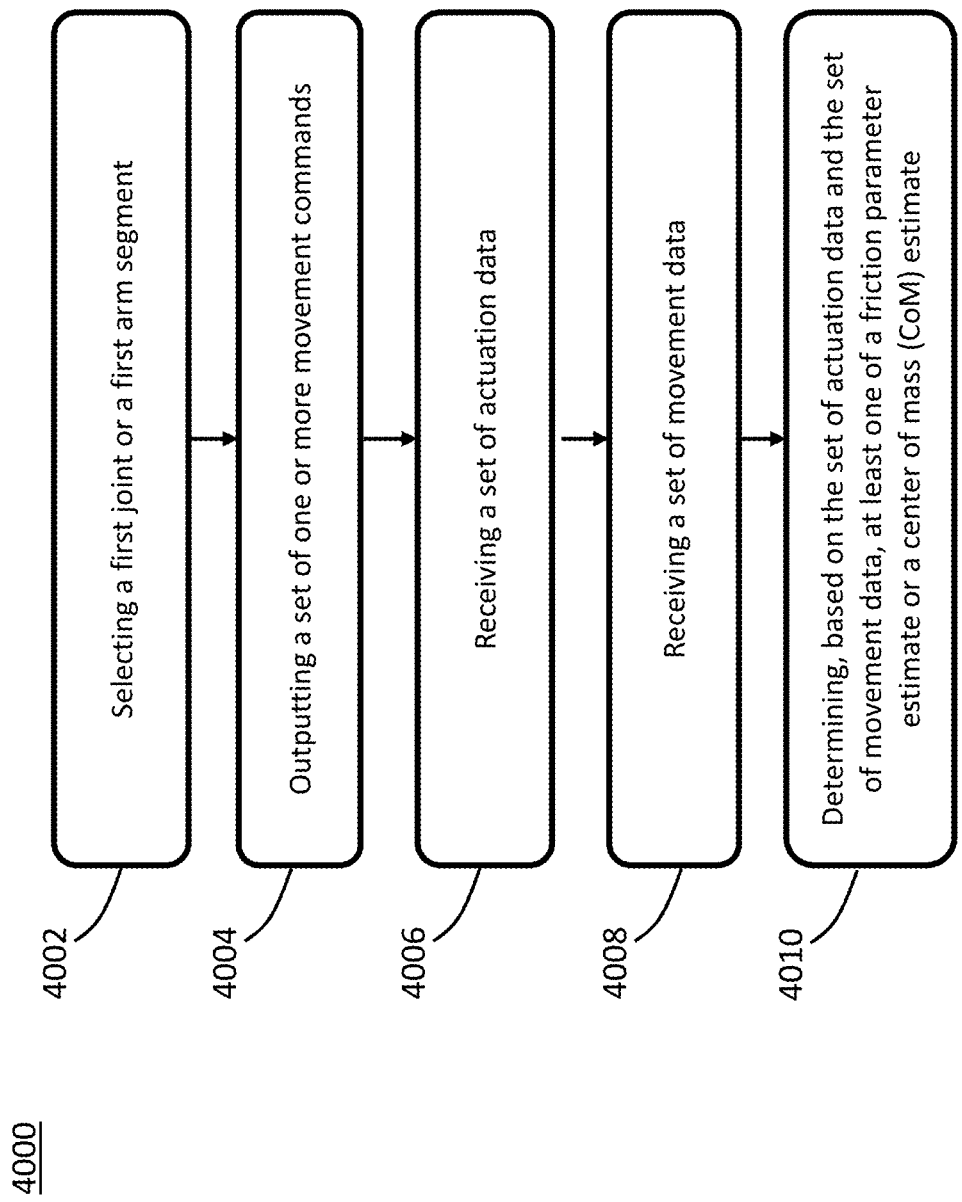
FIG. 4 illustrates a flow diagram which illustrates an example method for performing robot calibration, consistent with embodiments hereof.

FIG. 4 depicts a flow diagram for an example method 4000 for determining an estimated parameter value which describes a property (e.g., physical property) of a robot (e.g., 1200/3200). In some scenarios, the method 4000 may be performed as part of a robot calibration operation. One skilled in the art will realize that FIG. 4 illustrate one example of a method for estimating a property of a robot, and that other example methods for estimating the property of a robot may have fewer steps, more steps, and/or different steps than the method 4000. In an embodiment, the method 4000 may be performed by the computing system 1100, or more specifically by at least the processing circuit 1110 of the computing system 1100, such as when the processing circuit 1110 is executing instructions stored on the non-transitory computer-readable medium 1120 (e.g., instructions for the robot calibration module 1122).

In an embodiment, some or all of the steps of method 4000 may be performed multiple times, wherein the multiple times may correspond to multiple iterations. While the discussion below regarding the steps of method 4000 may illustrate one iteration of those steps, additional iterations may be performed. Each iteration may be specific to a particular arm segment, a particular joint, a particular pair of arm segments connected by the joint, and/or a particular physical property that is estimated (e.g., friction or center of mass) for that arm segment or joint. For example, one iteration or set of iterations may be performed during one time period to estimate physical properties of one arm segment or one joint, while a next iteration or next set of iterations may be performed during another time period to estimate physical properties of another arm segment or another joint. In some instances, one iteration may be performed to estimate one physical property (e.g., a friction parameter estimate) associated with an arm segment or a joint, while another iteration may be performed to estimate another physical property (e.g., center of mass) associated with the arm segment or joint. In an embodiment, the steps of method 4000 may be performed during one time period to estimate a particular property (e.g., a property relating to friction) for an arm segment, joint, or other component or combination of components of the robot, and some or all of the steps may be repeated during another time period to estimate another property (e.g., a property related to center of mass) for that component or combination of components.

In some implementations, the iterations may estimate properties for the arm segments or other components of the robot in a sequential manner. The sequential manner may involve, e.g., estimating a property or properties for one component out of a series of components of the robot, before estimating the property or properties for a next component in the series of components of the robot. For example, if the components of the robot are a series of arm segments ($3212_1$-$3212_6$) connected at a plurality of joints ($3214_1$-$3214_5$), the sequential manner may involve an upstream sequence in which an earliest iteration is used to estimate a property or properties (e.g., center of mass) of a most distal arm segment (e.g., $3212_6$, which is furthest downstream in the series of arm segments) or most distal joint (e.g., $3214_5$). After the earliest iteration, a next iteration may proceed upstream to estimate the property or properties (e.g., center of mass) for a proximal arm segment (e.g., $3212_5$) or joint (e.g., $3214_4$) that is immediately upstream of the most distal arm segment or most distal joint. The upstream sequence may use the next iterations to proceed in the upstream direction, so as to estimate the property or properties for the remaining arm segments (e.g., $3212_4$-$3212_1$) or remaining joints (e.g., $3214_3$-$3214_1$) in a sequence which proceeds from an arm segment (e.g., $3212_4$) or joint (e.g., $3214_3$) that is farthest from the robot base (e.g., 3202) towards an arm segment (e.g., $3212_1$) or joint (e.g., $3214_1$) that is closest to the robot base.

In an embodiment, the method 4000 may begin with or otherwise include a step 4002, in which the computing system 1100 selects at least one of a first joint or a first arm segment. The first joint may be selected from among a plurality of joints of the robot arm, such as the plurality of joints $3214_1$-$3214_5$ of the robot arm 3210 of FIGS. 3A-3C. Likewise, the first arm segment may be selected from among a plurality of arm segments of the robot arm, such as the plurality of arm segments $3212_1$-$3212_6$ of the robot arm 3210. As an example, the first joint that is selected may be, e.g., the joint $3214_4$, or the first arm segment that is selected may be, e.g., the arm segment $3212_5$. In this example, the first joint that is selected connects the first arm segment to another arm segment, such as a second arm segment (e.g., the arm segment $3212_4$) that is immediately adjacent to the first arm segment. If the plurality of arm segments in this example are connected in series, the second arm segment may be, e.g., directly connected to a proximal end of the first arm segment. In other words, the first arm segment may be directly connected to a distal end of the second arm segment, such that the first arm segment is distal to the second arm segment.

In an embodiment, the first joint or first arm segment may be selected in step 4002 so as to estimate a physical property associated with the first joint or first arm segment. More particularly, the computing system 1100 may select the first arm segment (e.g., $3212_5$) or the first joint (e.g., $3214_5$) so as to cause motion at the first joint, or more specifically relative motion between the first arm segment (e.g., $3212_5$) and the second arm segment (e.g., $3212_4$), which are connected by the first joint. As discussed below in more detail, the computing system 1100 may receive sensor data associated with the motion, and use the sensor data to estimate the physical property associated with the first joint or first arm segment. As stated above, this example of step 4002 may involve one iteration of step 4002, and may be used for estimating a physical property of the first joint or first arm segment. In some implementations, step 4002 may be repeated, so as to perform another iteration of step 4002. This other iteration may be used, e.g., to select the second arm segment (e.g., $3212_4$) or for a second joint (e.g., $3214_4$), so as to estimate the physical property for the second arm segment (e.g., $3212_4$) or for the second joint (e.g., $3214_4$).

In an embodiment, the computing system 1100 may select, as the first joint or first arm segment, any joint or arm segment of the robot arm (e.g., 1210/3210). In an embodiment, the computing system 1100 may in step 4002 select the first joint or the first arm segment according to a predefined sequence, such as the upstream sequence discussed above. For example, if multiple iterations of the step 4002 are performed, the upstream sequence may involve selecting a most distal arm segment or most distal joint of the robot arm during an earliest iteration of the multiple iterations of step 4002. During a subsequent iteration of step 4002, the upstream sequence may involve selecting another joint or another arm segment which is immediately upstream relative to a joint or arm segment that was selected during a previous iteration.

In an embodiment, the computing system 1100 may select multiple joints, multiple arm segments, or multiple pairs of immediately adjacent arm segments connected by the multiple joints, so as to simultaneously estimate a property for the multiple joints or multiple arm segments. Estimating the property for the multiple joints or multiple arm segments simultaneously may involve directly actuating the multiple joints or the multiple arm segments simultaneously (e.g., by simultaneously activating multiple actuators), so that the multiple arm segments simultaneously move relative to the multiple joints, respectively.

In an embodiment, the computing system 1100 may, for each iteration of step 4002, select a single joint, a single arm segment, or a single pair of immediately adjacent arm segments connected by the joint, without selecting any other joint, arm segment, or pair of immediately adjacent arm segments, so as to directly actuate only the selected joint or arm segment. More particularly, the selection of multiple joints or multiple arm segments simultaneously may lead to simultaneous movement of the multiple arm segments, as discussed above. Such simultaneous movement may create problems due to space constraints in an environment surrounding the arm segments or surrounding a robot formed by the arm segments. The space constraint may be due to, e.g., objects (e.g., wires) or structures (e.g., ceiling beam) near the robot. In such an example, the simultaneous movement of the multiple arm segments may potentially create a range of motion for the robot that can lead to collision with the objects or structures near the robot. Further, the simultaneous movement of the multiple arm segments may generate vibration or other form of measurement noise. The measurement noise may affect an accuracy of sensor data. For instance, the movement of one arm segment may generate a vibration that propagates across a robot arm and affect an ability to accurately measure the movement of another arm segment of the robot arm. In other words, the vibration caused by movement of the former arm segment may introduce measurement noise into sensor data that measures movement of the latter arm segment. This measurement noise arising from the simultaneous movement of multiple arm segments may affect an accuracy of the sensor data, and thus affect an accuracy of respective estimates for a property of the multiple arm segments. Thus, selecting multiple joints or multiple arm segments to simultaneously estimate a property of those joints or arm segments may affect an accuracy of resulting estimated values (also referred to as estimates).

Accordingly, as stated above, the computing system 1100 may, during step 4002 or an iteration of step 4002, select a joint of a robot arm without selecting any other joint of the robot arm, or may select an arm segment of the robot arm without selecting any other arm segment of the robot arm. More particularly, the computing system 1100 may, during a first iteration of step 4002 (which may precede and/or follow other iterations), select the first joint (e.g., $3214_4$) discussed above from among the plurality of joints (e.g., $3214_1$-$3214_5$) of the robot arm (e.g., 3210) without selecting any other joint of the plurality of joints, or may select the first arm segment (e.g., $3212_5$) discussed above from among the plurality of arm segments (e.g., $3212_1$-$3212_6$) without selecting any other arm segment of the plurality of arm segments. Such a selection may be made as part of performing robot calibration on a joint-by-joint basis or segment-by-segment basis. For example, such a basis of performing robot calibration may involve directly actuating a single joint or a single arm segment of a robot arm during a particular iteration or period of time, without directly actuating any other joint or any other arm segment of the robot arm during that iteration or time period, such that only a single joint or single arm segment is directly actuated during an iteration or corresponding time period of step 4002. In some instances, if the robot arm (e.g., 3210) has a plurality of respective actuators (e.g., $3330_1$-$3330_5$ of FIGS. 3B and 3C) for outputting actuation at the plurality of joints (e.g., $3330_1$-$3330_4$), step 4002 may involve selecting a first actuator (e.g., $3330_4$) for activation during a particular time period or iteration without selecting any other actuator of the plurality of actuators for activation during that time period or iteration. Such a selection may cause the first actuator (e.g., $3330_4$) to be activated without causing activation of any other actuator of the plurality of actuators during the time period or iteration. The selection may result in the first actuator (e.g., $3330_4$) being activated to actuate the first joint (e.g., $3214_4$), or more specifically to output torque or force at the first joint (e.g., $3214_4$) so as to cause rotation at the first joint (e.g., $3214_4$) during that time period or iteration. The rotation at the first joint (e.g., $3214_4$) may refer to the first joint (e.g., $3214_4$) being rotated, or refer to an arm segment (e.g., $3212_5$) that is connected to the first joint being rotated relative to the first joint ($3214_4$) or relative to another arm segment (e.g., relative to arm segment $3212_4$, which is connected to arm segment $3212_5$ via the joint $3212_4$). Because no other actuator is selected for activation during this time period or iteration in this example, there is no rotation at any other joint of the plurality of joints during this time period or iteration. In other words, the first actuator (e.g., $3330_4$) may be activated during this time period or iteration to cause movement of the first arm segment (e.g., $3212_5$) relative to the first joint (e.g., $3214_4$) or relative to a second arm segment (e.g., $3212_4$) immediately adjacent to the first arm segment (e.g., $3214_5$), while there is no movement of any other arm segment relative to a corresponding joint during this time period or iteration, or while there is no relative movement between any other pair of immediately adjacent arm segments.

Returning to FIG. 4, the method 4000 may include a step 4004, in which the computing system 1100 may, during an iteration of the step, generate a set of one or more movement commands for causing relative movement between the first arm segment (e.g., $3212_5$) and the second arm segment (e.g., $3212_4$) via the first joint (e.g., $3214_4$) selected in step 4002, or more specifically for causing the first arm segment to move relative to the second arm segment via the first joint. In some instances, the one or more movement commands may be used for activating a first actuator (e.g., $3330_4$) of the plurality of actuators, and may be outputted or otherwise communicated by the computing system 1100 to the first actuator (e.g., $3330_4$) via the communication interface 1130 of FIG. 2B. For example, if the first actuator (e.g., $3330_4$) is a motor, the one or more movement commands may each be a motor command for activating the motor. In some implementations, the one or more motor commands may form or include one or more signals (e.g., a voltage signal or current signal) used to activate the motor. In some instances, the one or more commands may be capable of controlling a level or magnitude at which the motor is activated, such as via a duration of the one or more movement commands or via information encoded in the one or more movement commands. The level or magnitude at which the motor is activated may be used to control an amount of torque or force output by the motor.

Figure 5A:
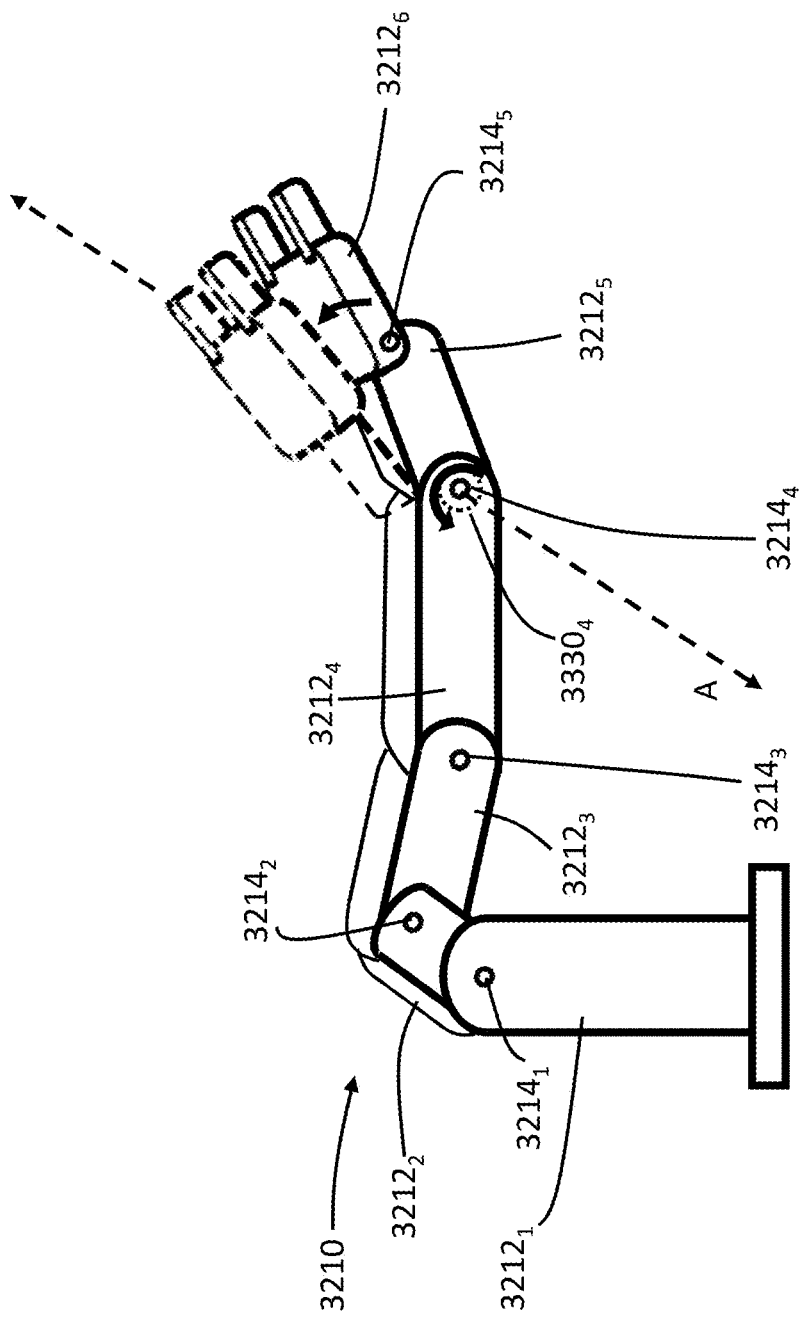
FIGS. 5A and 5B illustrate movement of an arm segment, consistent with embodiments hereof.
Figure 5B:
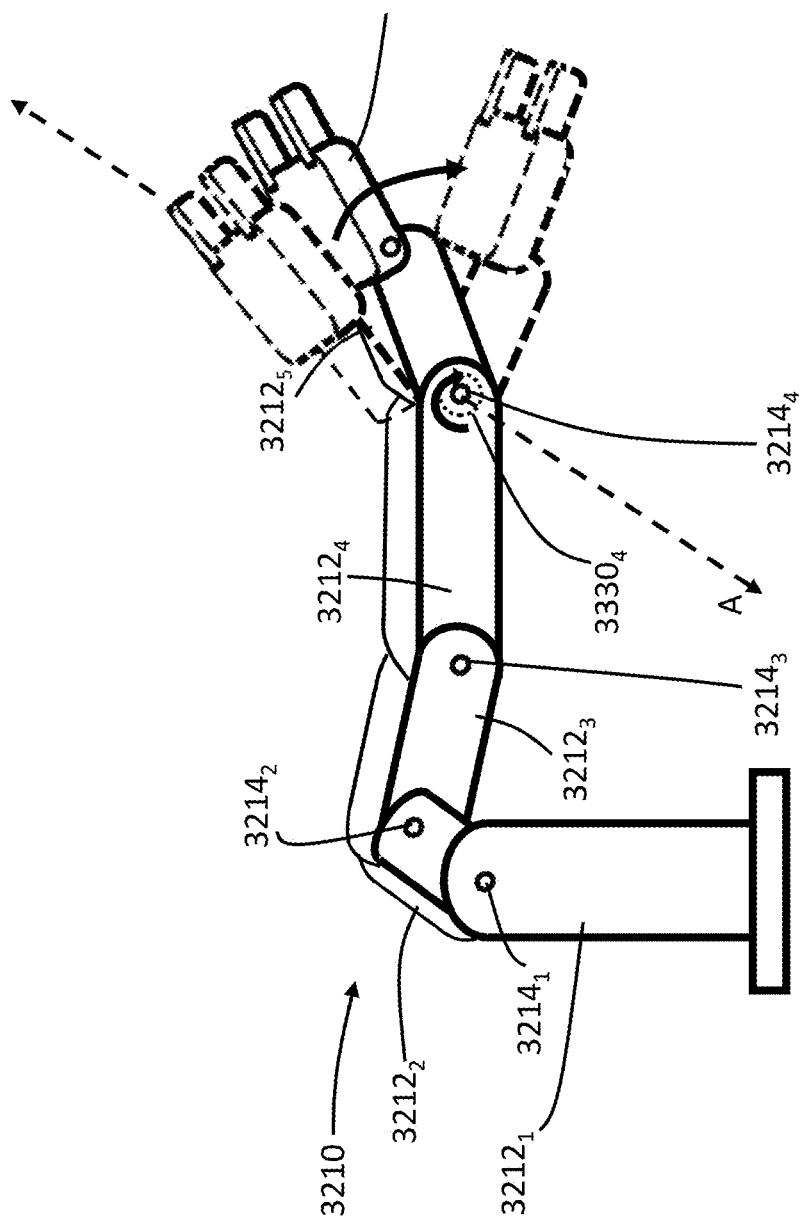

In an embodiment, when an actuator (e.g., $3330_4$) receives the one or more movement commands, the actuator may output motion at a joint, or more specifically output a force or torque to cause motion at the joint. As stated above, motion at a joint may refer to the joint itself moving (e.g., rotating), or refer to one component of the joint moving relative to another component of the joint, or refer to an arm segment moving relative to the joint. For instance, FIG. 5A illustrates the actuator $3330_4$ outputting, in response to one or more movement commands, a first torque in a first direction (e.g., a counterclockwise direction) to cause the arm segment $3212_5$ to rotate relative to the arm segment $3212_4$ about the joint $3214_4$ in the first direction from a starting position (e.g., baseline position) to an intermediate position. FIG. 5B illustrates the actuator $3330_4$ outputting, response to the one or more movement commands, a second torque in a second and opposite direction (e.g., clockwise direction) to cause the arm segment $3212_5$ to then rotate relative to the arm segment $3212_4$ about the joint $3214_4$ in the second direction from the intermediate position to an end position.

As stated above, the computing system 1100 may in an embodiment select one joint or one arm segment to be directly actuated during a particular time period or iteration without selecting any other joint or any other arm segment to be directly activated during that time period or iteration. In some instances, the computing system 1100 may in step 4004 generate the one or more movement commands such that the one or more movement commands cause motion at the selected joint, or more specifically motion of the selected arm segment relative to the joint (or relative to an immediately adjacent arm segment), without causing motion at any other joint during that time period or iteration, or more specifically without causing relative movement between any other pair of immediately adjacent arm segments (e.g., without causing movement of any other arm segment relative to a corresponding joint). More particularly, the set of one or more movement commands that are generated in one iteration may be for causing activation of the first actuator (e.g., $3330_4$) without causing activation of any other actuator of the plurality of actuators in that iteration (e.g., without activating actuators $3330_1$-$3330_3$ and $3330_5$). As discussed above, activating only one actuator at a time may better accommodate space constraints imposed by an environment in which a robot is located. More particularly, because the one or more movement commands in this example cause motion at only one joint at a time, the risk of collision with an object or structure in the environment of the robot may be reduced. Activating only one actuator at a time may further improve an accuracy of the robot calibration. That is, the one or more movement commands may cause one actuator (e.g., $3330_4$) to be activated to output motion at one joint while the other actuators remain deactivated, such that the deactivated actuators are not outputting motion at their corresponding joints. The lack of such motion at the other joints may reduce an amount of vibrational noise or other noise, which may improve an accuracy by which motion is measured for the joint corresponding to the activated actuator. The more accurate measurement may lead to more accurate results from robot calibration.

In an embodiment, the computing system 1100 may generate the one or more movement commands based on a movement profile, which may be or may include information that describes an intended or planned characteristic of motion at the selected joint or motion of the selected arm segment (e.g., motion of the first arm segment relative to the second arm segment discussed above). In some instances, the movement profile may be a position profile, which specifies intended or planned values for a position (e.g., rotational position) of the selected arm segment or selected joint. In some instances, the movement profile may be a speed profile, velocity profile, and/or an acceleration profile, which may describe one or more intended or planned values for a speed, velocity, and/or acceleration (e.g., rotational speed, rotational velocity, or rotational acceleration) of the selected joint or selected arm segment. In some implementations, the values in the movement profile may be a function of time, or more generally correspond to different points in time. In some implementations, the movement profile may include or represent a waveform that describes how position, speed, velocity, and/or acceleration of the motion is to vary over time. In some instances, the speed profile may more specifically be a velocity profile that specifies speed and direction of rotation.

In an embodiment, the one or more movement commands generated in step 4004 may be used for determining a friction parameter estimate associated with friction at a joint between two arm segments, such as the first arm segment (e.g., $3212_5$) and the second arm segment (e.g., $3212_4$) selected during one iteration of step 4002. For instance, the friction parameter may be a coefficient of viscous friction between the first arm segment and the second arm segment, or may be an amount of static friction (also referred to as coulomb friction) between the two arm segments. In some implementations, the one or more movement commands may be generated based on a movement profile that is intended to generate sensor data which is optimized for estimating friction. More particularly, the one or more movement commands may be generated based on a speed profile that attempts to or is intended to cause a resulting motion to undergo a wide range of values for speed or velocity. More particularly, such a speed profile may enhance a measurement of certain types of friction, such as viscous friction between two components, which may have a magnitude that depends on speed of relative movement between two components. Thus, a speed profile which attempts or plans to cause the motion at a joint or arm segment to have a broad range of values for speed or velocity may allow for measuring a broad range of values for the viscous friction, which may improve an accuracy for estimating a characteristic of the viscous friction (e.g., for estimating a coefficient of viscous friction).

In an embodiment, the speed profile used for estimating the friction parameter may include a plurality of values for speed (e.g., rotational speed) corresponding to different points in time within a particular time period or iteration, such as a first time period in which the first arm segment or first joint is selected. The plurality of values may include at least one value that is equal to a predefined maximum operation speed. The predefined maximum operation speed may be, e.g., a rated maximum speed for an actuator (e.g., $3330_4$) or for a robot arm (e.g., 3210) or arm segment being actuated. In some instances, the predefined maximum operation speed may be provided by a manufacturer of the actuator, robot, or the robot arm, and may be stored in the non-transitory computer-readable medium 1120 or elsewhere. In some scenarios, the predefined maximum operation speed may have been determined by the manufacturer as a maximum speed value at which the actuator or the robot arm can operate while a resulting movement is still stable. In some instances, the predefined maximum operation speed may have been determined by the manufacturer as a maximum speed value at which the actuator or the robot can operate for a sustained period of time without creating a significant risk of damage to the actuator or the robot arm.

Figure 6A:
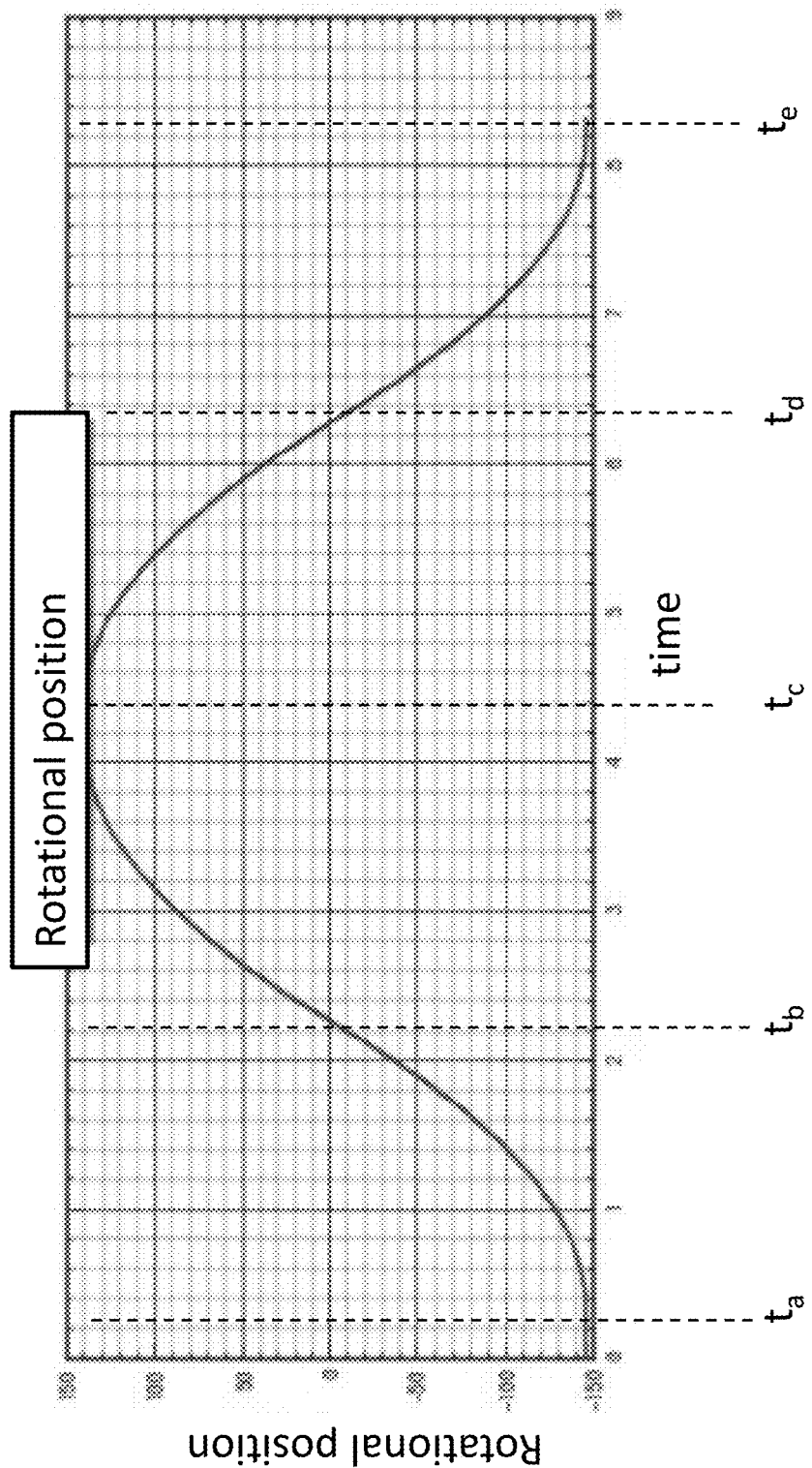
FIGS. 6A-6C illustrate rotational position, rotational velocity, or rotational acceleration for performing robot calibration, consistent with embodiments hereof.
Figure 6B:
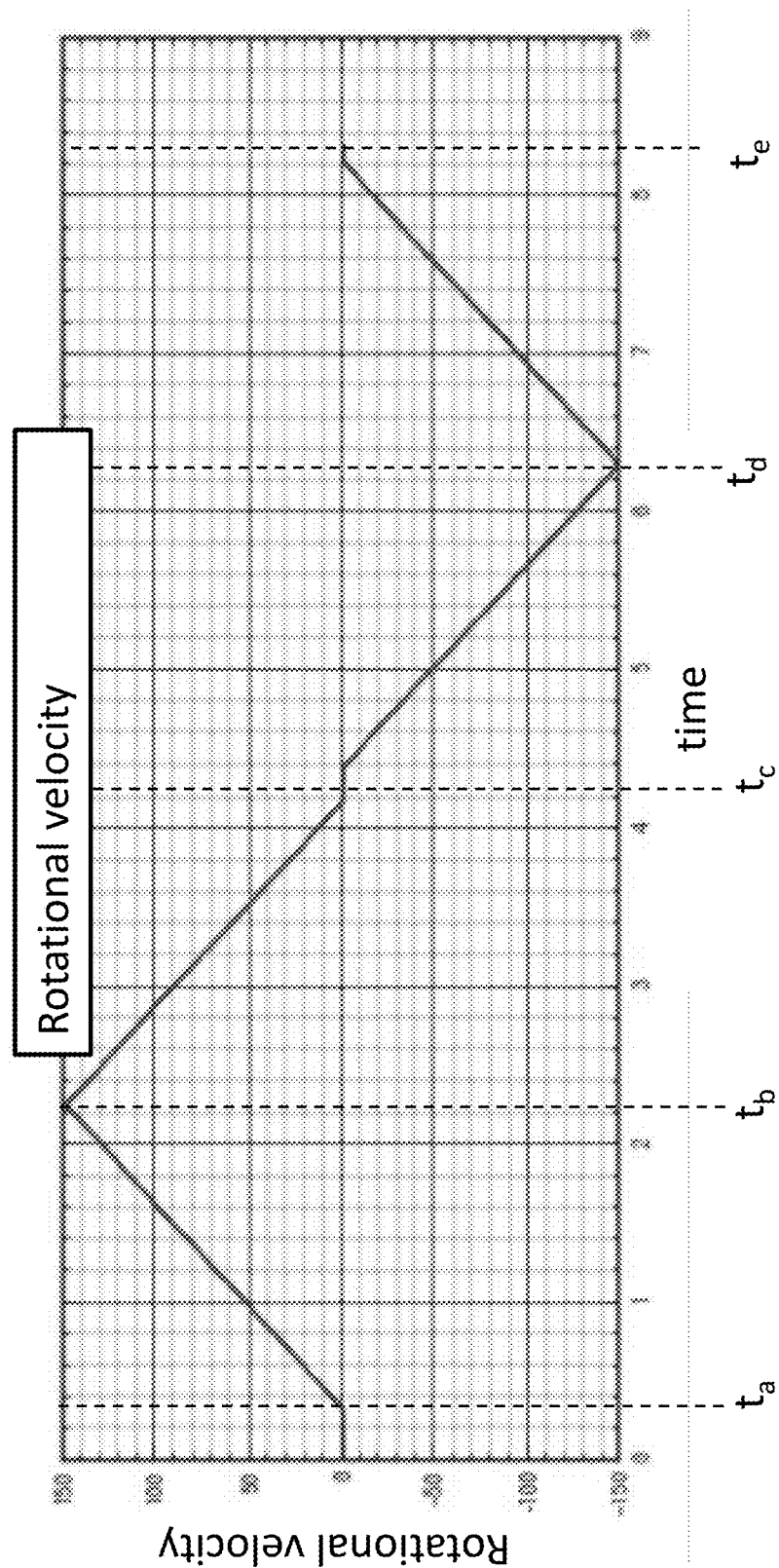
Figure 6C:
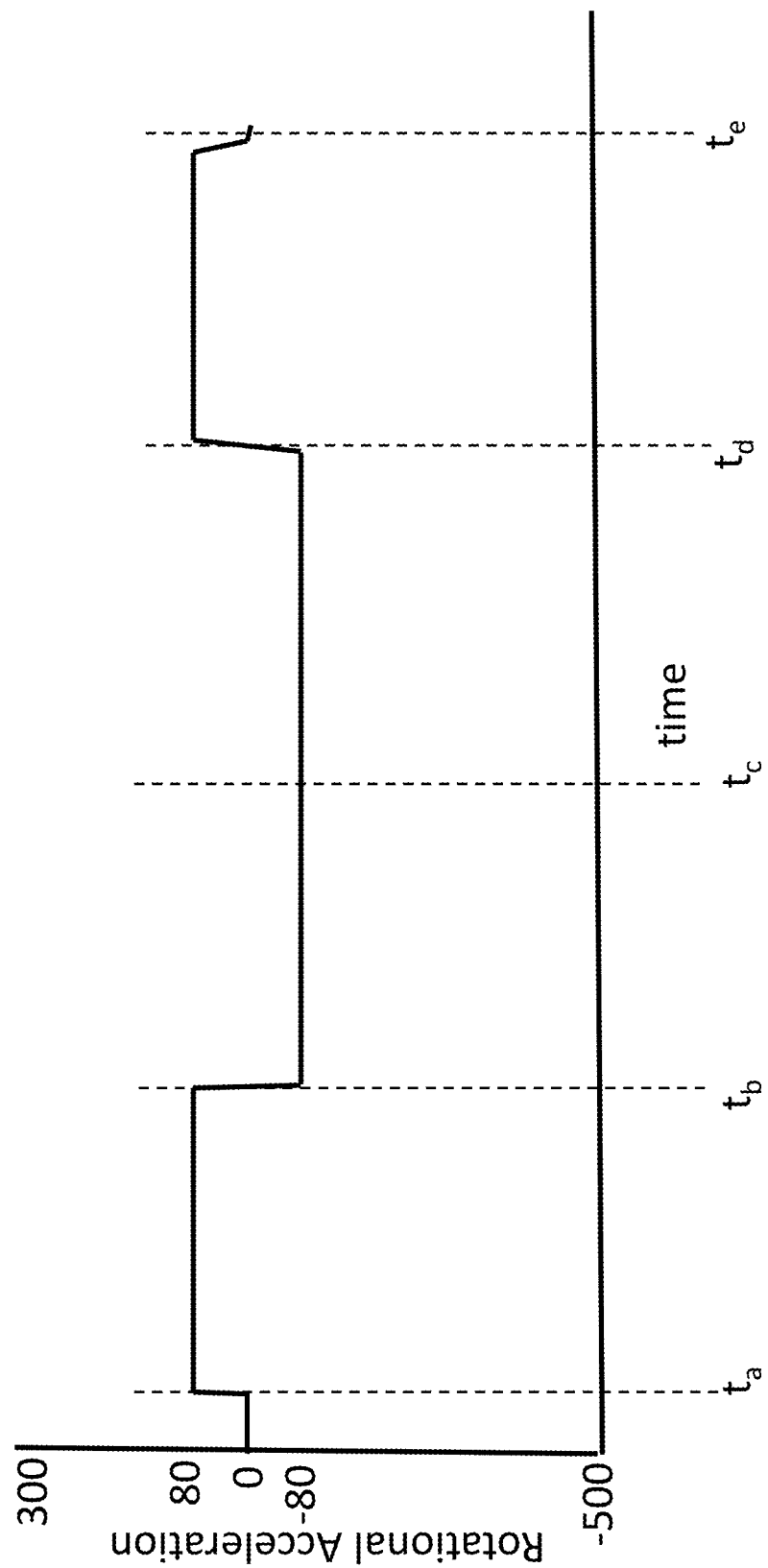

As an example, FIGS. 6A-6C illustrate a movement profile that may be used for estimating a friction parameter. More particularly, FIG. 6A depicts a position profile that describes rotational displacement of a joint or arm segment, or more specifically rotational position of one arm segment (e.g., the first arm segment discussed above) relative to a baseline position. FIG. 6B depicts a corresponding speed profile, or more specifically a velocity profile, that describes values of rotational speed (or, more specifically, rotational velocity), of the arm segment. The values of the rotational speed may be relative to, e.g., a frame of reference provided by the baseline position, or a frame of reference provided by a corresponding joint or an adjacent arm segment (e.g., the first joint or the second arm segment discussed above). FIG. 6C depicts a corresponding acceleration profile that describes values of rotational acceleration of the arm segment relative to the frame of reference. In the example of FIG. 6B, an actuator or robot arm may have a predefined maximum operation speed of 150 degrees per second. As illustrated in FIG. 6B, the speed profile may attempt or plan to cause the rotational speed to reach the predefined maximum operation speed at to and again at $t_c$. As further discussed above, this speed profile may be used for estimating the friction parameter In FIG. 6B, the illustrated values may describe rotational velocity. More specifically, they indicate that the rotational velocity may have a first direction (e.g., counterclockwise direction) during a time range from $t_a$ to $t_c$. This time range may correspond to, e.g., the rotation illustrated in FIG. 5A. The values further indicate that the rotational velocity may have a second direction (e.g., clockwise direction) during a time range from $t_c$ to $t_e$, and may correspond to the rotation illustrated in FIG. 5B. As further illustrated in FIG. 6B, the rotational velocity may begin decreasing in magnitude toward zero at time $t_b$, and at time $t_d$. These points in time may correspond to when an actuator (e.g., $3330_4$) for causing the rotation switches a direction of torque being outputted (e.g., from the counterclockwise direction to the clockwise direction).

In an embodiment, the one or more movement commands generated in step 4004 may be used for determining a center of mass (CoM) estimate for an arm segment, such as the first arm segment (e.g., $3212_5$) selected in the iteration discussed above for step 4002. In such an embodiment, the CoM estimate may be determined with a movement profile which is intended to generate sensor data that is optimized for estimating CoM. In some implementations, the movement profile used for estimating CoM may be different than the movement profile used for estimating friction. For instance, a first speed profile or first acceleration profile may be used for determining a friction parameter estimate, while a second speed profile or second acceleration profile may be used for determining a CoM estimate.

Figure 7A:
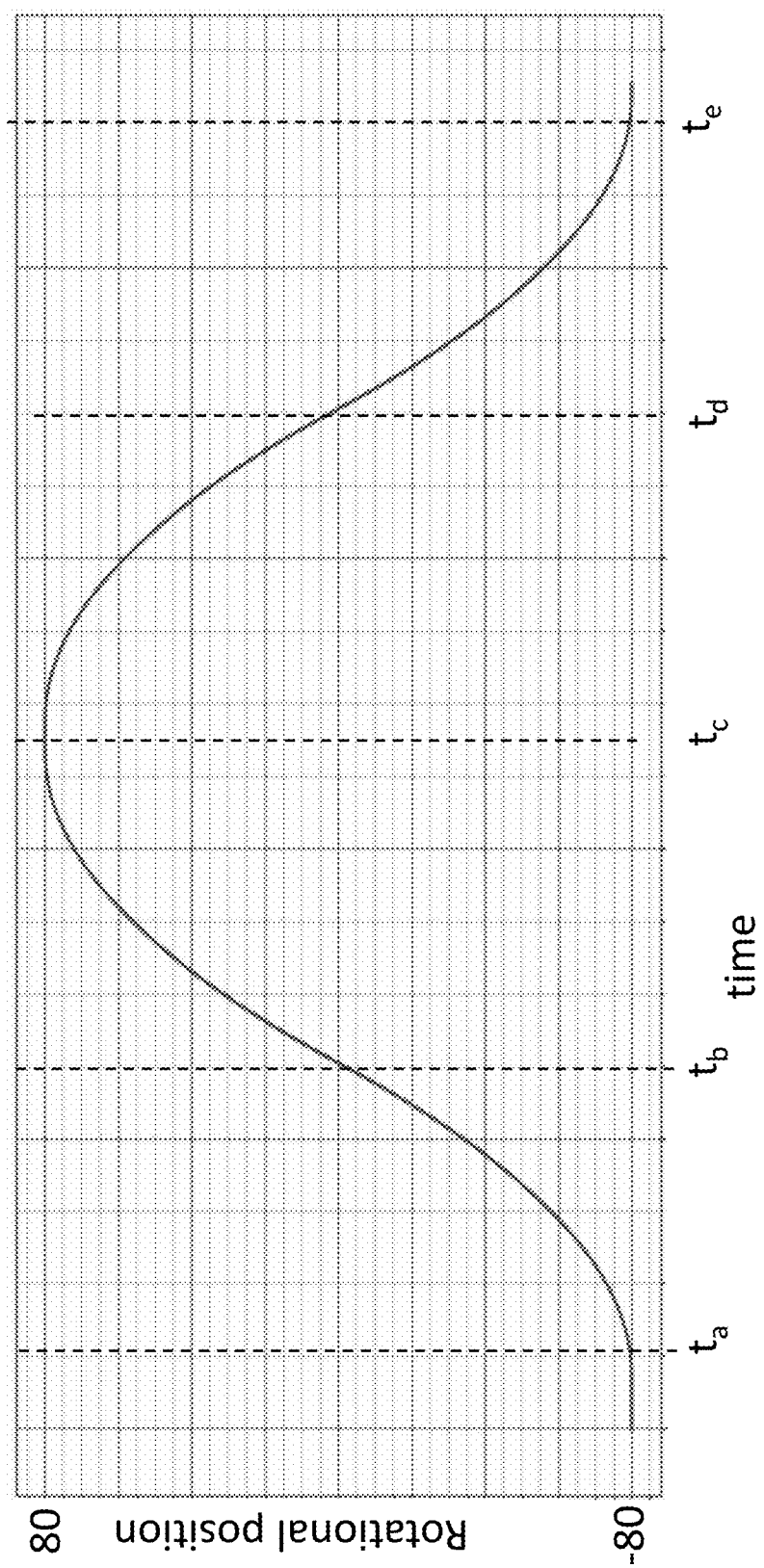
FIGS. 7A-7C illustrate rotational position, rotational velocity, or rotational acceleration for performing robot calibration, consistent with embodiments hereof.
Figure 7B:
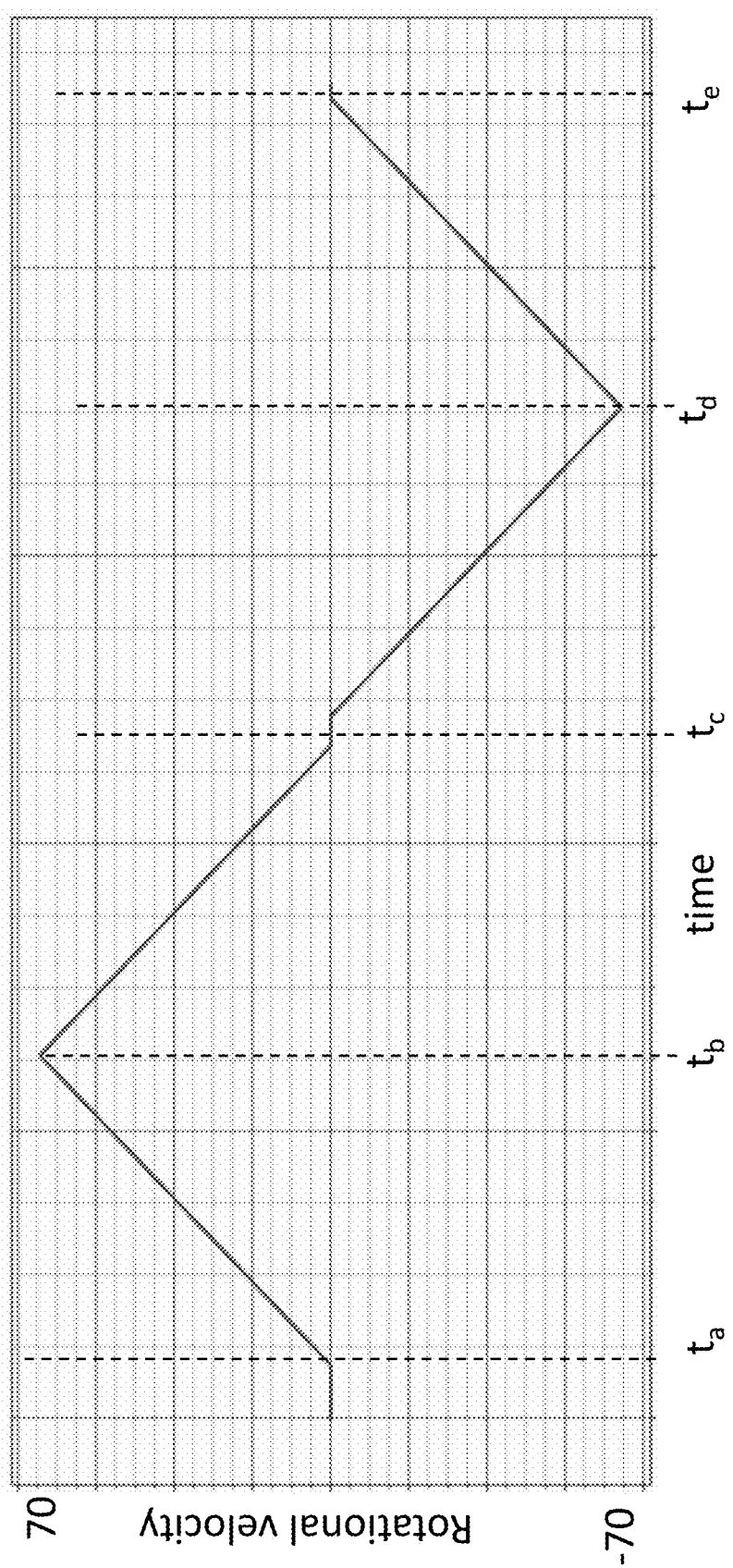
Figure 7C:
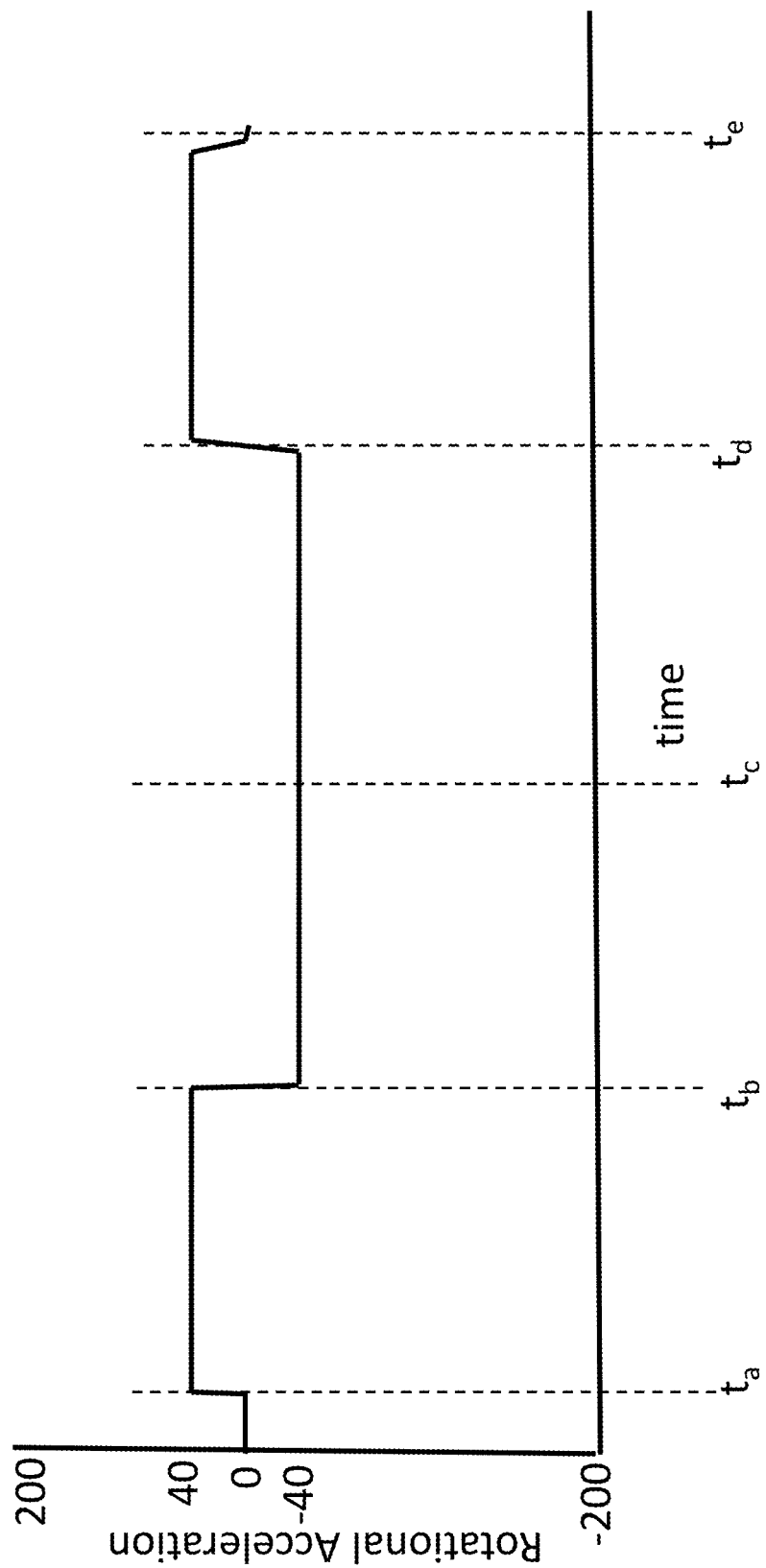

In an embodiment, the second speed profile or second acceleration profile, which is used for estimating CoM, may attempt or plan to limit a speed or acceleration of motion. More particularly, motion which reaches a high speed or acceleration may generate an increased amount of vibration, which may introduce measurement noise into sensor data. Thus, limiting speed or acceleration may reduce the amount of measurement noise. Further, the CoM of an arm segment may in some instances depend on its rotational position rather than its rotational speed. Thus, limiting the speed or acceleration, even if it reduces a range of speed values achieved by the motion, may not adversely affect an accuracy of the CoM estimate. In one example, the first speed profile used for estimating friction may include a first plurality of values for rotational speed, while the second speed profile used for estimating CoM may include a second plurality of values for rotational speed. The second plurality of values may correspond to different points in time within a particular time period or iteration, and the second speed profile may limit the speed such that all of the second plurality of values are less than or equal to a predefined speed threshold. In one example, the predefined speed threshold may be, e.g., a predefined percentage (e.g., 10%) of the predefined maximum operation speed. FIGS. 7A to 7C illustrate a position profile, a corresponding speed profile, and a corresponding acceleration profile which may be used for estimating CoM. More particularly, FIG. 7B illustrates an example of the second speed profile used to estimate CoM. In this example, all the speed values in the speed profile may be less than or equal to a speed threshold of 70 degrees per second. In some implementations, if an acceleration profile is used for estimating CoM, the acceleration profile may cause a rate of movement (e.g., relative movement between two adjacent arm segments) to be less than or equal to a predefined acceleration threshold during an entirety of the time period in which the movement is occurring.

As stated above, one iteration of various steps of method 4000 may be used to estimate one property for a joint or arm segment, and another iteration of these steps may be performed to estimate another property for the joint or arm segment. In one example, one iteration of the various steps (e.g., 4002, 4004) may generate a first set of one or more movement commands for causing relative movement during a first time period or first iteration between a pair of arm segments, such as the first arm segment (e.g., $3212_5$) and the second arm segment (e.g., $3212_4$) discussed above. The first set of one or move movement commands may be generated based on the first movement profile discussed above to determine, e.g., the friction parameter estimate. In this example, another iteration of the steps may be performed (e.g., steps 4002 and 4004 may be repeated) to generate a second set of the one or more movement commands to also cause relative movement between the first arm segment (e.g., $3212_5$) and the second arm segment (e.g., $3212_4$). The second set of one or more movement commands may be generated based on the second movement profile discussed above to determine, e.g., the CoM estimate.

In an embodiment, if the steps (e.g., 4002, 4004) of method 4000 are used to determine a CoM estimate, the computing system 1100 may be configured to determine whether movement of the selected joint or selected arm segment will occur about an axis that is vertical or too close to being vertical. In some instances, the axis may be a rotational axis, and the computing system 1100 may determine whether the rotational axis has an orientation that is vertical or too close to being vertical, wherein the vertical orientation may refer to an orientation along which the force of gravity is exerted. The orientation of the rotational axis may depend on a pose of the robot arm (e.g., 3210), or more specifically depend on how the selected arm segment or selected joint is oriented. More particularly, estimating the CoM for an arm segment may in some implementations rely on causing the CoM of the arm segment to move closer to or farther away from a pivot point (e.g., joint $3214_4$) during rotation or other movement of the arm segment. If the rotational axis for this movement is too vertical, the CoM of the arm segment may remain at a constant distance from the pivot point, which may interfere with an ability to estimate the CoM. Thus, the computing system 1100 may determine whether the arm segment or the joint has an orientation which causes the rotational axis to have a vertical orientation or too close to having the vertical orientation.

Figure 8:
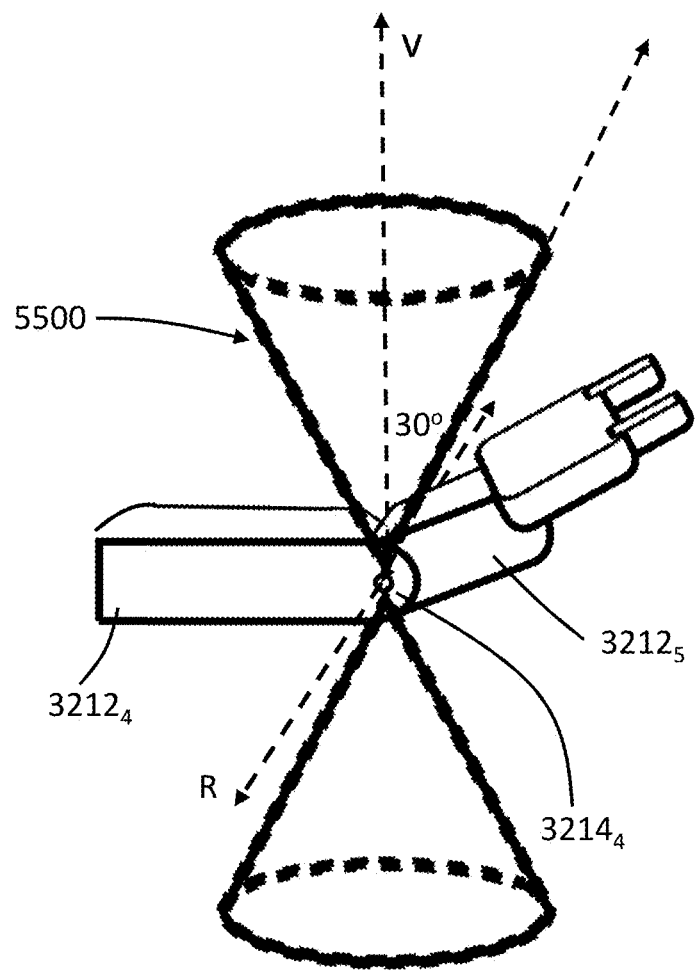
FIG. 8 illustrates an imaginary cone that represents possible orientations for a rotational axis, consistent with an embodiment hereof.

In an embodiment, the computing system 1100 may use an imaginary cone to represent a range of orientations which are too close to a vertical orientation (i.e. an orientation that is parallel with the direction of gravity), and determine whether the rotational axis is in the imaginary cone. More particularly, the imaginary cone may represents a range of possible orientations for the rotational axis, where the range of possible orientations include a vertical orientation, and include other orientations which differ from the vertical orientation by no more than a predefined angle threshold. In other words, the other possible orientations represented by the cone form angles with the vertical orientation, and these angles are less than or equal to the predefined angle threshold. For instance, FIG. 8 illustrates an imaginary cone 5500 which represents a vertical orientation V and a range of other orientations which are within a predefined angle (e.g., 30 degrees) of the vertical orientation V. In practical terms, the predefined angle threshold relative to the vertical orientation V (i.e. represented by the imaginary cone 5500) can correspond to orientations of the rotational axis in which it is difficult to distinguish the amount of gravitational influence on the selected joint from noise contributions on the actual amplitude of the selected joint. In other words, the amount of gravitational influence may be too low to accurately distinguish from noise contributions on the selected joint when the rotational axis is within the predefined angle threshold (i.e. within the cone). In this example, the computing system 1100 may determine whether a rotational axis R for the rotation of a particular arm segment is within the imaginary cone 5500. FIG. 8 depicts an example in which the rotational axis R is substantially horizontal, and thus is not within the imaginary cone 5500. If, in another example, the computing system 1100 determines that a rotational axis is in the imaginary cone, the computing system 1100 may output an indication of such a determination (of the rotational axis being in the imaginary cone). For example, the indication may be a visual indication on a graphical user interface. The indication may flag the resulting CoM estimate as possibly having a sub-optimal level of accuracy, which may be used to evaluate whether to re-determine the CoM estimate using another pose for the robot arm.

In an embodiment, the computing system 1100 may receive sensor data that describes actuation and/or movement of an arm segment or joint, such as the first joint or the first arm segment discussed above. For example, returning to FIG. 4, the method 4000 may include a step 4006, in which the computing system 1100 receives a set of actuation data associated with a joint or arm segment that was selected in step 4002 (e.g., the first joint or the first arm segment). The set of actuation data may be sensor data indicative of overall torque or overall force at the joint (e.g., $3214_4$) in a time period or iteration during which the arm segment is moving relative to the joint or relative to an adjacent arm segment, or more specifically in the time period in which the relative movement between the two arm segments (e.g., the first arm segment and the second arm segment) is occurring. In some embodiments, the set of actuation data may be generated by a sensor (e.g., the sensor $3222_4$) associated with the selected joint (e.g., $3214_4$) or arm segment (e.g., $3212_5$), and may be communicated to the computing system 1100 via the communication interface 1130.

Figure 9:
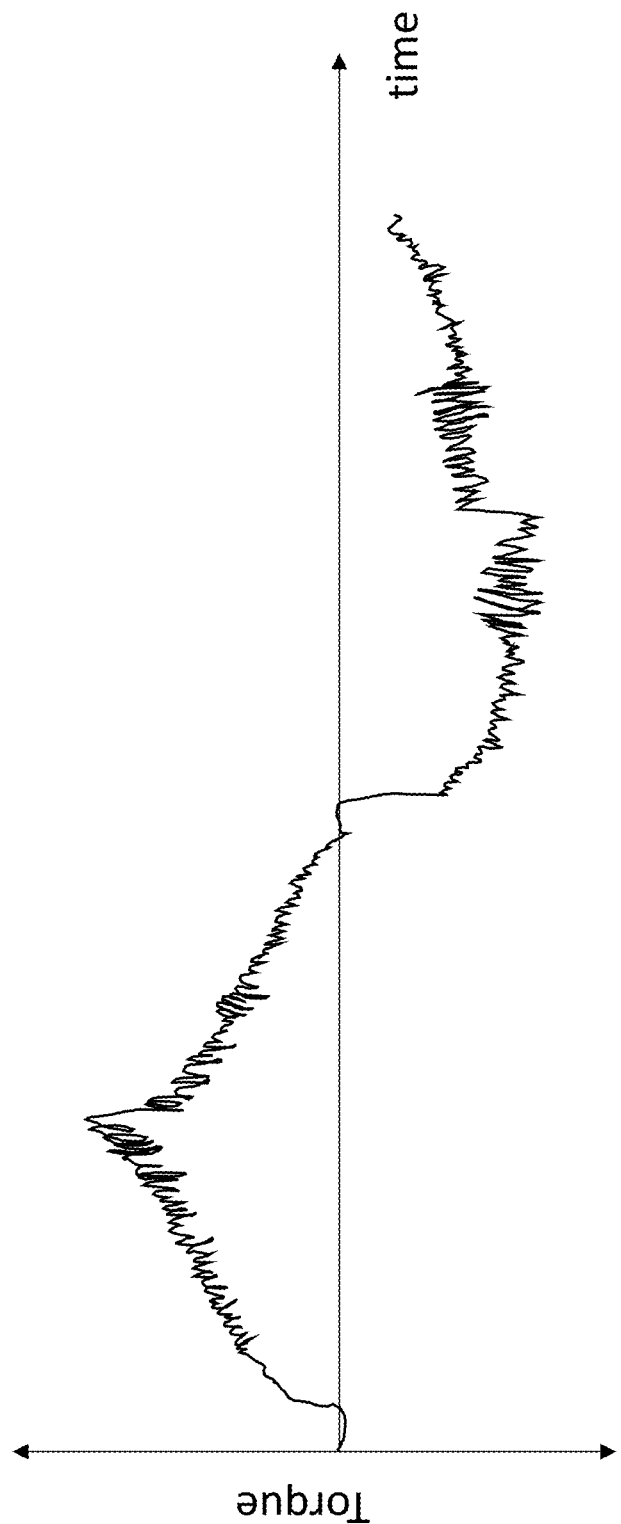
FIG. 9 illustrates an example of sensor data for performing robot calibration, consistent with an embodiment hereof.

In an embodiment, the set of actuation data may directly indicate or be directly proportional to the overall force or overall torque at the selected joint (e.g., the first joint, such as $3212_4$) or on the arm segment (e.g., the first arm segment, such as $3212_5$), or may indirectly indicate the overall force or overall torque. FIG. 9 illustrates an example of the overall torque indicated by the actuation data. As stated above, the sensor (e.g., $3222_4$) for generating the actuation data may in some instances be an electrical current sensor, while the set of actuation data may be directly proportional to/directly measure or describe electrical current flowing through a corresponding actuator (e.g., $3330_4$), wherein the electrical current is for causing the movement of the selected arm segment, such as movement of the first arm segment relative to the second arm segment. In such an example, computing system 1100 may be configured to calculate or otherwise determine the overall force or overall torque at the joint or on the arm segment based on values of the electrical current which are directly measured by the actuation data. As stated above, the overall torque or current may be calculated by multiplying the values of the electrical current by a predefined torque constant.

Returning to FIG. 4, the method 4000 may include a step 4008, in which the computing system 1100 receives a set of movement data. The set of movement data may be sensor data indicative of an amount or rate of movement of a selected arm segment or selected joint, such as the relative movement between the first arm segment (e.g., $3212_5$) and the second arm segment (e.g., $3212_4$) during the first time period or first iteration. In such an example, the amount of relative movement may indicate a rotational position of the first arm segment relative to a baseline position provided by the second arm segment or the first joint (e.g., $3212_4$), while the rate of relative movement may indicate a rotational speed, rotational velocity, or rotational acceleration of the first arm segment relative to a frame of reference provided by the second arm segment or the first joint. In some instances, the set of movement data may directly measure the rotational speed, rotational velocity, or rotational acceleration. In some instances, the set of movement data may directly measure rotational position, and the computing system 1100 may be configured to calculate or otherwise determine the rotational speed, rotational velocity, or rotational acceleration based on how the rotational position changes over time. In some embodiments, the set of movement data may be generated by a sensor (e.g., the sensor $3224_4$) associated with the selected joint (e.g., the joint $3214_4$).

In some embodiments, the set of movement data may include values which describe movement that substantially matches the movement profile in FIGS. 6A through 7C. For example, if the set of movement data has values that describe rotational position of an arm segment relative to a baseline position, the rotational position described by the values of the movement data may substantially match the positional profile in FIG. 6A or FIG. 7A. Similarly, if the set of movement data has values which describes rotational speed of an arm segment (e.g., the first arm segment, such as $3212_5$) relative to a particular reference frame, the values of the movement data may describe movement that substantially matches the velocity profile in FIG. 6B or 7B.

Returning to FIG. 4, the method 4000 may include a step 4010, in which the computing system 1100 determines at least one of a friction parameter estimate or a center of mass (CoM) estimate for a selected joint or selected arm segment. Such a determination may be based on the set of actuation data and the set of movement data. As an example, one iteration of step 4010 may involve determining a friction parameter estimate associated with friction between the first arm segment (e.g., $3212_5$) and the second arm segment (e.g., $3212_4$), while the center of mass (CoM) estimate is associated with the first arm segment (e.g., $3212_5$). In a more specific example, the friction parameter that is estimated may be a coefficient of viscous friction between the first arm segment and the second arm segment, or an amount of static friction between the first arm segment and the second arm segment. Further in this example, the CoM estimate may be a value of a distance r between the first joint (which may act as a pivot point) and a CoM of the first arm segment. As stated above, the steps of method 4000 may in some scenarios be repeated so as to perform multiple iterations of the steps. In such instances, one iteration of steps 4002-4008 may be performed during a first time period to determine the friction parameter estimate, and another iteration of these steps may be performed during a second time period (which may be before or after the first time period) to determine the CoM estimate.

Figure 10A:
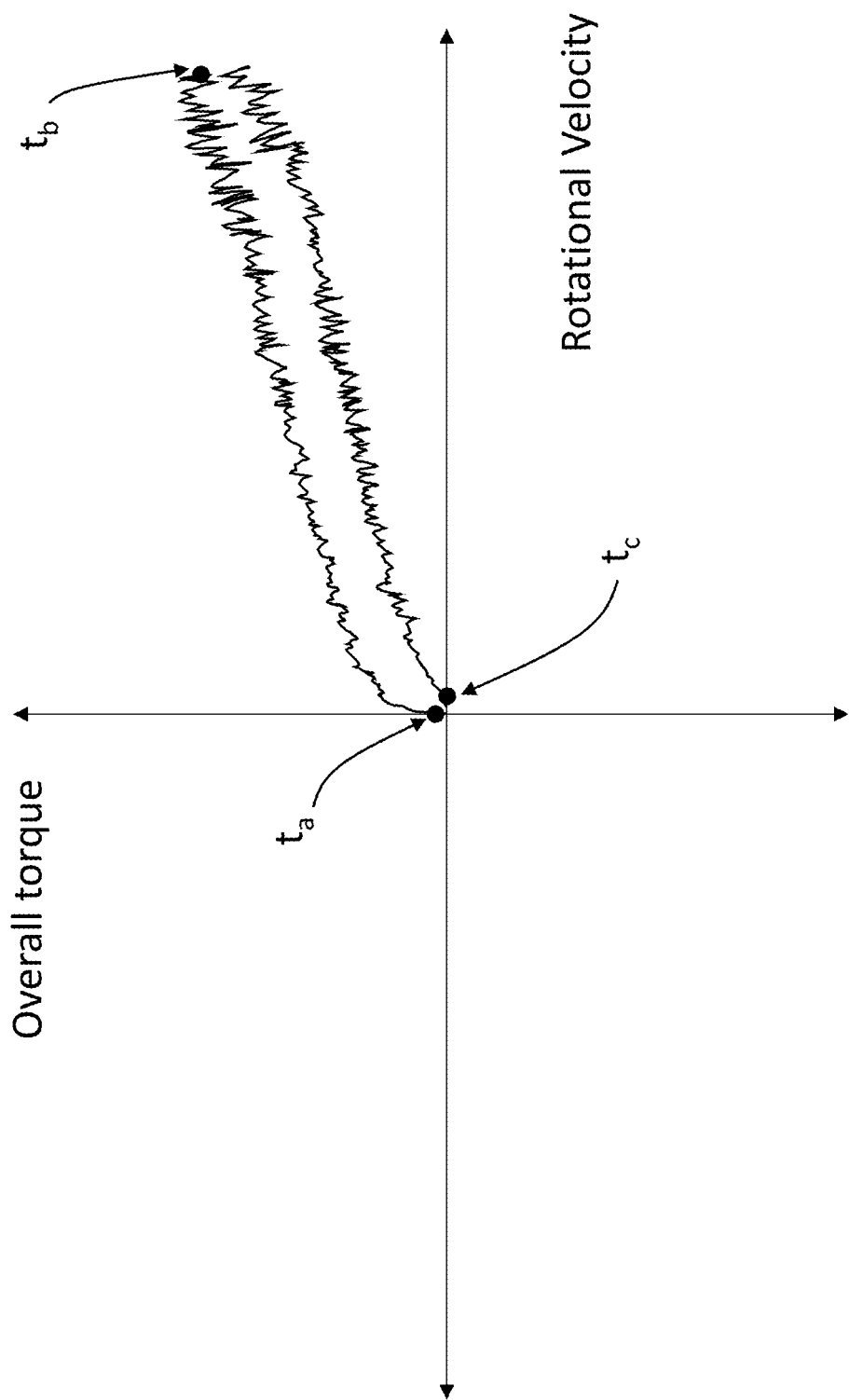
FIGS. 10A-10D illustrate examples of sensor data for performing robot calibration, consistent with an embodiment hereof.
Figure 10B:
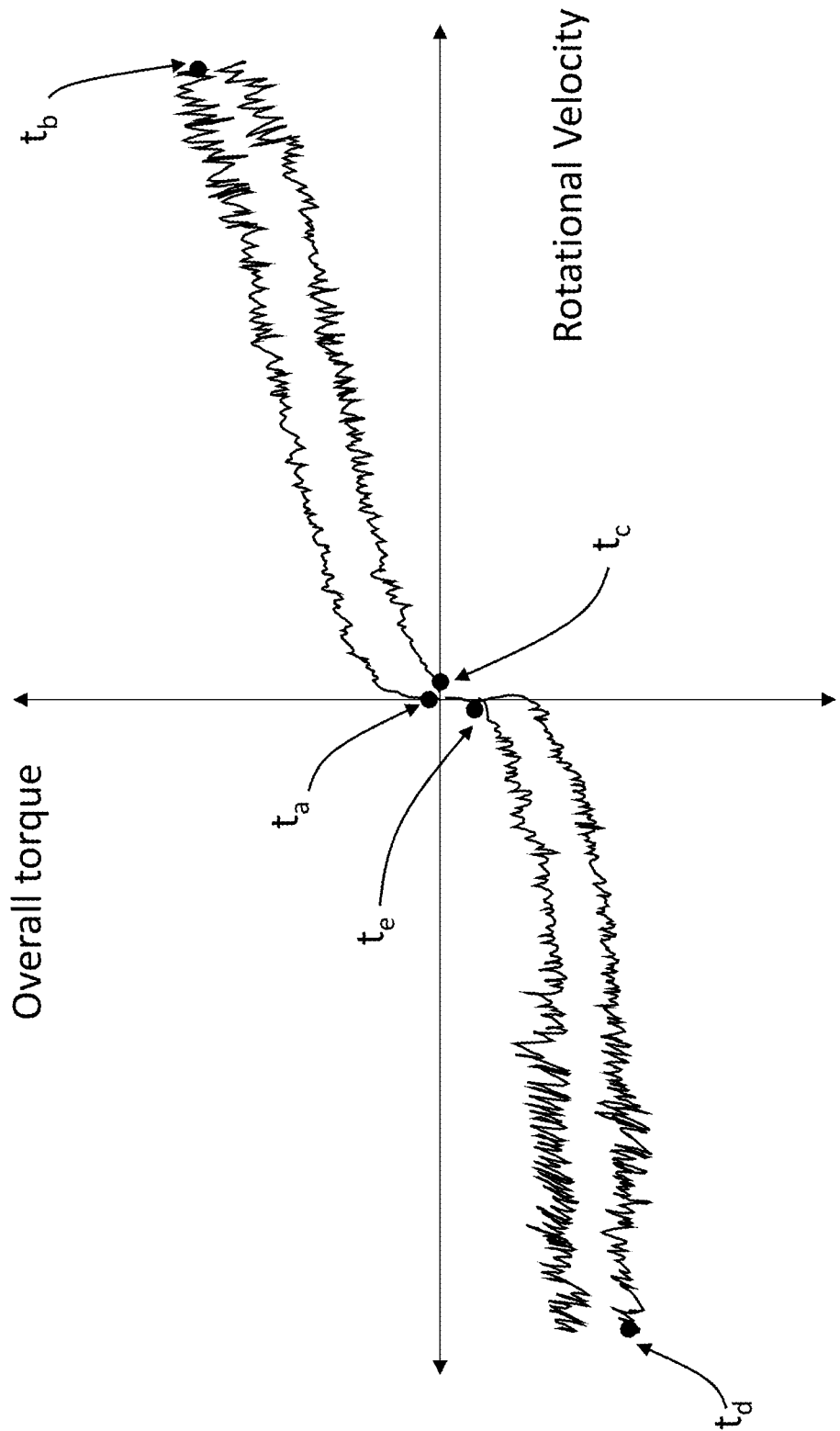

FIGS. 10A-10D illustrate how a frictional parameter estimate may be determined based on a set of actuation data and a set of movement data. More particularly, FIGS. 10A and 10B are plots of combinations of: (i) values of overall torque and (ii) corresponding values of rotational velocity. In one iteration of step 4010, these velocity values may may define relative movement between the first arm segment (e.g., $3212_5$) and the second arm segment (e.g., $3212_4$). More particularly, each combination of values may include a first value which represents overall torque at a joint (e.g., the first joint) at a respective point in time, and a second value which represents rotational velocity at that point in time. For example, the first value may indicate overall torque on, e.g., the first arm segment relative to the second arm segment at a point in time, and the second value may indicate rotational velocity between the first arm segment and the second arm segment at that point in time. The plotted combination of values in FIG. 10A may correspond to, e.g., the rotation illustrated in FIG. 5A, in which the first arm segment (e.g., $3212_5$) increases rotational speed in a first direction, and then stops rotating. The plotted combination of values in FIG. 10B may correspond to the rotation illustrated in FIGS. 5A and 5B, in which the first arm segment (e.g., $3212_5$) increases rotational speed in a first direction, stops rotating, increases rotational speed in a second direction, and then stops rotating again.

In an embodiment, the overall torque represented by the actuation data may be based on a contribution from the inertia of the actuator between two arm segments, such as the first arm segment (e.g., $3212_5$) and the second arm segment (e.g., $3212_4$). In an embodiment, the overall torque may be based on a contribution from friction. More particularly, the overall torque may in some instances be described by the example equation:

$$\tau = \text{contribution from actuator} + \text{contribution from gravity} + \text{contribution from friction} \quad (1)$$

In the above equation, $\tau$ refers to the overall torque on the first joint (e.g., $3214_4$), and may be equal to or derived from the actuation data. In this example, the contribution from the actuator may refer to a torque or force that is output by the actuator (e.g., $3330_4$). For instance, in an iteration in which a friction parameter is being estimated for the first arm segment (e.g., $3212_5$) or the first joint (e.g., $3214_4$) discussed above, this contribution from the actuator may be represented by the term $I\ddot{\theta}$, in which $\ddot{\theta}$ represents rotational acceleration of the first arm segment relative to the second arm segment, and in which I is a moment of inertia of the first arm segment.

In an embodiment, the contribution from gravity in this iteration may refer to a torque caused by a weight of the downstream segments, such as the first arm segment and the end effector (also referred to as end effector apparatus), wherein the torque acts relative to a pivot point provided by the first joint. For instance, the contribution from gravity may represented by the term mgr cos $\theta$ or mgr sin $\theta$, in which $\theta$ represents a rotational position of the downstream segments relative to the gravity vector (or relative to a baseline position), while mg represents a weight contribution of the downstream segments. More specifically, m represents a mass of the downstream segments, while g represents a rate of gravitational acceleration (e.g., 9.8 m/sec$^2$). In this example, r represents a distance between a center of mass (CoM) of the first arm segment and the first joint. In some implementations, the value of the mass m or weight mg may be a known value that is stored in the non-transitory computer-readable medium 1130.

In an embodiment, the contribution from friction may refer to how much resistance is provided by friction against motion or a change in motion of the first arm segment relative to the second arm segment or relative to the first joint. In some scenarios, the contribution from friction may be represented as $s + b\dot{\theta}$, in which s represents an amount of static friction (also referred to as coulomb friction) between the first arm segment and the second arm segment, $\dot{\theta}$ represents a rotational velocity of the first arm segment relative to a frame of reference provided by the second arm segment, and b represents a coefficient of viscous friction between the first arm segment and the second arm segment. In such a scenario, the static friction may remain constant during relative rotation between the first arm segment and the second arm segment, while the viscous friction may increase in magnitude as rotational velocity increases in magnitude.

Figure 10C:
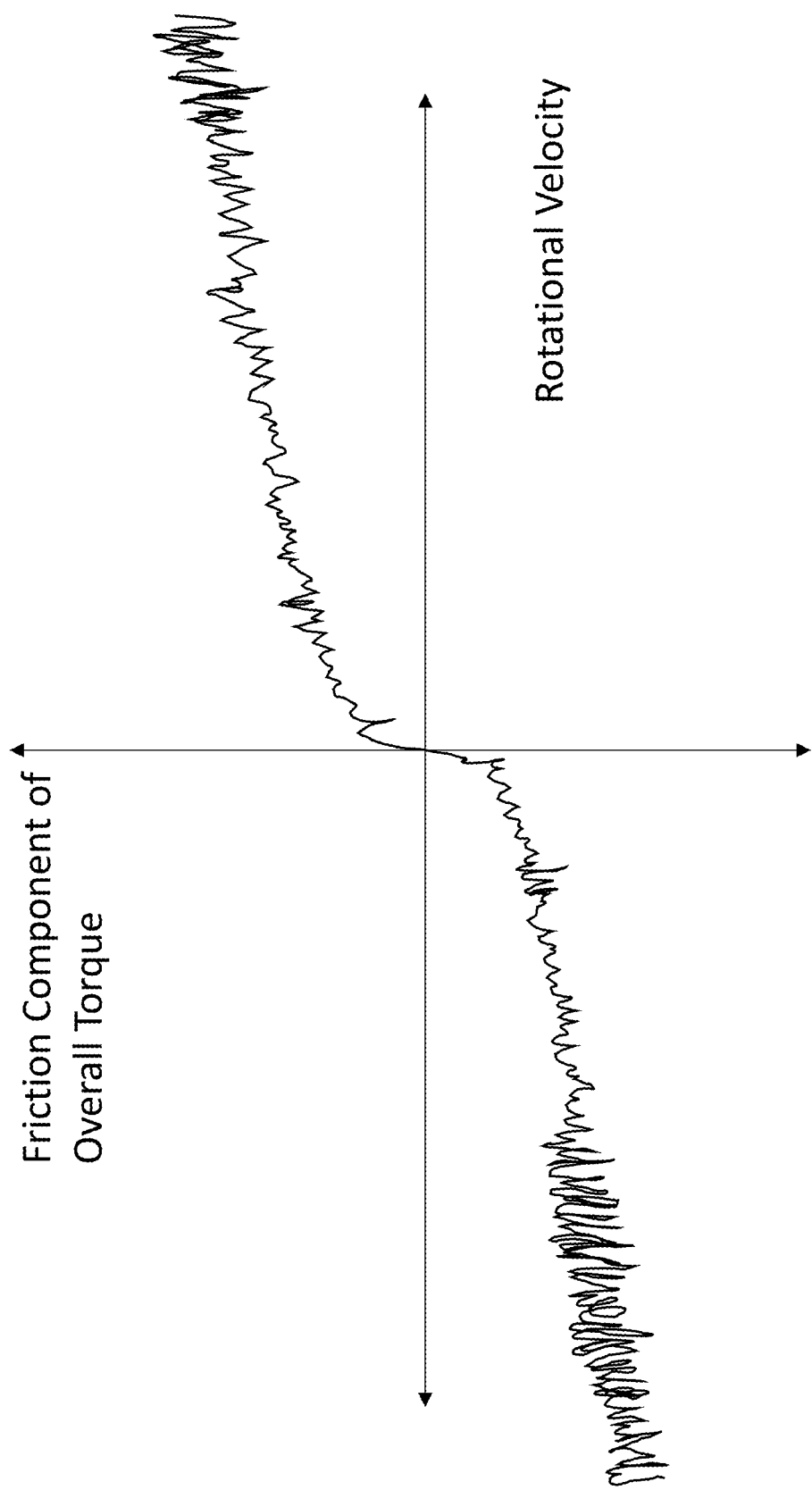
Figure 10D:
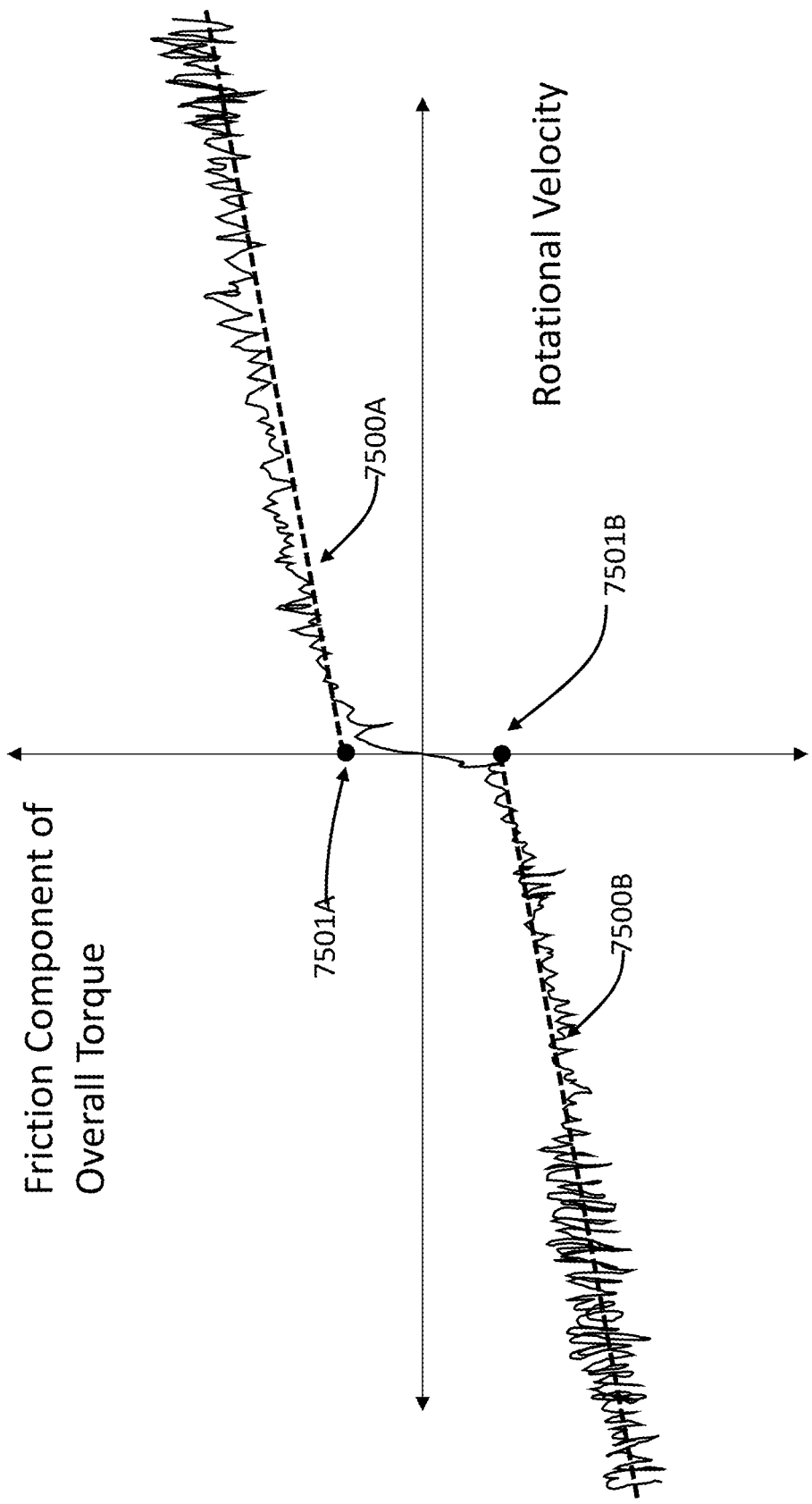

In an embodiment, the computing system 1100 may be configured to effectively extract or otherwise determine, from the actuation data, the contribution from friction, which may also be referred to as a friction component of the overall torque. For instance, FIGS. 10C and 10D illustrate combination of values that represent, for various points in time, a friction component of overall torque. These values for the frictional component of overall torque may be combined with values of rotational velocity. In some instances, the computing system 1100 may be configured to extract the friction component of the overall torque by subtracting, from the overall torque indicated by the actuation data, the contribution of the actuator and the contribution of gravity, if those contributions are known. For instance, if the computing system 1100 has performed a previous iteration of steps 4002-4010 to determine an estimate for I (representing the moment of inertia) or an estimate for r (representing the CoM), the computing system 1100 may use those estimates, as well as values of $\theta$, $\dot{\theta}$, $\ddot{\theta}$ provided by or derived from the movement data, to determine the contribution from the actuator (which may be estimated as $I\ddot{\theta}$) and the contribution from gravity (which may be estimated as mgr cos $\theta$). The computing system 1100 may then subtract out the contribution of the actuator and the contribution of gravity from the overall torque to extract the contribution of friction. In some instances, the computing system 1100 may effectively extract the friction component by solving a set of simultaneous equations that relate overall torque to friction, as discussed below in more detail.

As illustrated in FIG. 10D, the computing system 1100 may be configured to use a relationship between the friction component of the overall torque (which may be extracted from the actuation data) and the rotational velocity (which may be provided by or extracted from the movement data) to determine a friction parameter estimate. More particularly, the friction between two arm segments may include static friction and viscous friction. As discussed above, the static friction may in some instances be represented as a constant (s) while the viscous friction may be represented as being a linear function ($b\dot{\theta}$) of rotational velocity, such that the friction component of the overall torque may be approximated as $s + b\dot{\theta}$. In such instances, the computing system 1100 may apply a linear fit to the combination of values in FIG. 10D, which represent the friction component of overall torque. More particularly, the computing system 1100 may determine a line 7500A and/or 7500B which fits through or otherwise approximates the combination of values of FIGS. 10C and 10D. The line 7500A or 7500B may represent the above expression of $s + b\dot{\theta}$. More particularly, the computing system 1100 may determine the coefficient of viscous friction (b) to be equal to or based on a slope of the line 7500A or 7500B (or as an average of the respective slopes of those lines), and determine the static friction (s) to be equal to or based on a height of the line 7500A or 7500B (e.g., equal to the Y-intercept 7501A or 7501B, or an average of their magnitudes).

As stated above, the computing system 1100 may be configured to effectively extract the friction component by solving a set of simultaneous equations that relate overall torque to friction. As stated above, the overall torque $\tau$ may be based on a contribution from the actuator, a contribution from gravity, and a contribution from friction. In one example, the overall torque may be based on the more specific relationship below:

$$\tau = [I^*\ddot{\theta}] + [mgr^*\sin(\theta+\alpha)] + [s^*\text{Sign}(\dot{\theta})] + [b^*\dot{\theta}] \text{ or}$$

$$\tau = [I^*\ddot{\theta}] + [mgr^*\cos(\theta+\alpha)] + [s^*\text{Sign}(\dot{\theta})] + [b^*\dot{\theta}]$$

In this example, values for the parameter T may be provided by or derived from the actuation data. The parameters $\theta$, $\dot{\theta}$, $\ddot{\theta}$ (which may represent rotational position, rotational velocity, and rotational acceleration, respectively) may be provided by or derived from the movement data. As further discussed above, the parameter I represents a moment of inertia, the parameter mg represents a weight of an arm segment (e.g., the first arm segment), the parameter r represents a distance between a CoM of an arm segment and a joint to which the arm segment is connected (e.g., the first joint), the parameter s represents an amount of static friction, and the parameter b represents a coefficient of viscous friction. In the above example, α may be an angle between a baseline position and a horizontal orientation, as illustrated in FIG. 3E. Further, the Sign($\dot{\theta}$) function may be used to represent the static friction having a direction which is opposite a direction of motion. More particularly, the Sign($\dot{\theta}$) function may have a value of 1 when $\dot{\theta}$ is positive, a value of −1 when $\dot{\theta}$ is negative, and a value of 0 when $\dot{\theta}$ is 0.

In an embodiment, the computing system 1100 may be configured to use the above relationship to generate a set of equations corresponding to different points in time or, more generally, to different combinations of: (i) torque value and (ii) position, velocity, or acceleration value. For instance, the computing system 1100 may be configured to generate the following set of equations, which may be represented as a matrix:

$$\begin{bmatrix} \tau_1 \\ \tau_2 \\ \vdots \\ \tau_n \end{bmatrix} = \begin{bmatrix} [I\ddot{\theta}_1] + [CoM * \sin(\theta_1 + \alpha)] + [s * \mathrm{Sign}(\dot{\theta}_1)] + [b * \dot{\theta}_1] \\ [I\ddot{\theta}_2] + [CoM * \sin(\theta_2 + \alpha)] + [s * \mathrm{Sign}(\dot{\theta}_2)] + [b * \dot{\theta}_2] \\ \vdots \\ [I\ddot{\theta}_n] + [CoM * \sin(\theta_n + \alpha)] + [s * \mathrm{Sign}(\dot{\theta}_n)] + [b * \dot{\theta}_n] \end{bmatrix}$$

In the above example, $\tau_1, \tau_2, \ldots \tau_n$ may correspond to different torque values that are provided by or derived from the actuation data. Further, $\ddot{\theta}_1, \ddot{\theta}_2, \ldots \ddot{\theta}_n$ may correspond to different acceleration values that are provided or derived from the movement data, and which correspond to $\tau_1, \tau_2, \ldots \tau_n$, respectively. Similarly, $\dot{\theta}_1, \dot{\theta}_2, \ldots \dot{\theta}_n$ may correspond to different velocity values that are provided by or derived from the movement data, and $\theta_1, \theta_2, \ldots \theta_n$ may correspond to different position values that are provided by or derived from the movement data, wherein these values of position or velocity also correspond to $\tau_1, \tau_2, \ldots \tau_n$. In an embodiment, these values may correspond to different points in time. For instance, $\tau_1, \theta_1, \ddot{\theta}_1$, and $\dot{\theta}_1$ may correspond to a measurement made by a sensor(s) at first point in time (e.g., $t_a$ in FIGS. 10A and 10B), while $\tau_2, \theta_2, \ddot{\theta}_2$, and $\dot{\theta}_2$ may correspond to a measurement made by the sensor(s) at a second point in time (e.g., $t_b$ in FIGS. 10A and 10B).

In an embodiment, the computing system 1100 may be configured to solve the above set of simultaneous equations to determine respective values for s, b, I, m, r, and/or α. Solving the equations may involve determining respective values for s, b, I, m, r, and/or α which satisfy or approximately satisfy the above equations. In some implementations, the computing system 1100 may be configured to apply a least squares fitting method to determine respective values for the above parameters which, e.g., minimize an amount of error between the measured torque values $\tau_1, \tau_2, \ldots \tau_n$ from the actuation data and predicted torque values (also referred to as torque prediction values, or a prediction of torque values) calculated using the movement data and estimated values for the above parameters.

In an embodiment, the computing system 1100 in step 4010 may determine the frictional parameter estimate based on the technique discussed above. For instance, the frictional parameter estimate may be a value of the parameter s discussed above, which represents static friction, and/or may be a value of the parameter b discussed above, which represents a coefficient of viscous friction. In some instances, as stated above, the actuation data, movement data, and/or other sensor data used to determine the friction parameter estimate may have been generated in a manner that is optimal for estimating friction. For instance, the sensor data may have been generated based on a speed profile which attempts to cause a rotational speed of an arm segment (relative to a frame of reference provided by another arm segment) to reach a predefined maximum operation speed at least once during a particular iteration of time period.

In the above example, the computing system 1100 determines not only an estimate for a friction parameter (e.g., s or b), but also determines an estimate for the parameter r, which may represent a center of mass (CoM) for an arm segment. In some instances, this estimate may be used by the computing system as a result of robot calibration. In other instances, the computing system 1100 may treat this estimate as a by-product of estimating friction, and may discard the CoM estimate after the iteration is over. In such instances, the computing system 1100 may perform another iteration which may be more optimized for estimating CoM. More particularly, the sensor data used to estimate friction may in some instances be sub-optimal for estimating CoM. In such instances, the computing system 1100 may perform another iteration of steps 4002-4010 (or just steps 4004-4010) to obtain a set of sensor data which is more optimal for estimating CoM. For example, this set of actuation data and movement data may have been generated with a speed profile which attempts to limit speed or rotation below a predefined threshold, as discussed above.

In an embodiment, the computing system 1100 may use the above technique of solving simultaneous equations to determine a CoM estimate in one iteration of step 4010. In such an iteration, the computing system 1100 may also determine an estimate for a friction parameter (e.g., s or b). The computing system 1100 may use such an estimate as a result of robot calibration, or may treat the estimate as a by-product of estimating CoM, and discard the estimate of the friction parameter after the iteration is over.

Figure 11A:
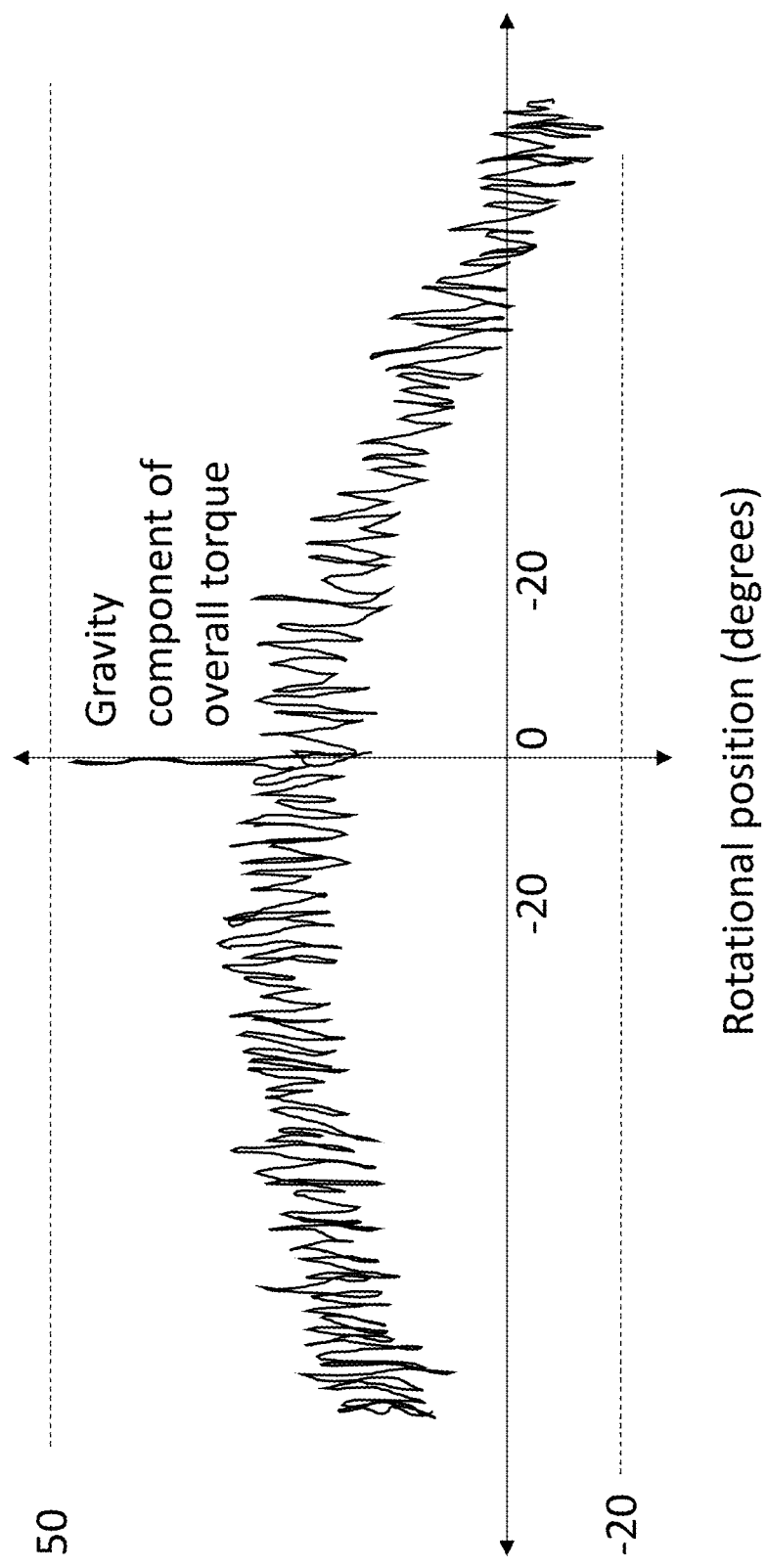
FIGS. 11A and 11B illustrate an example of sensor data for performing robot calibration, consistent with an embodiment hereof.
Figure 11B:
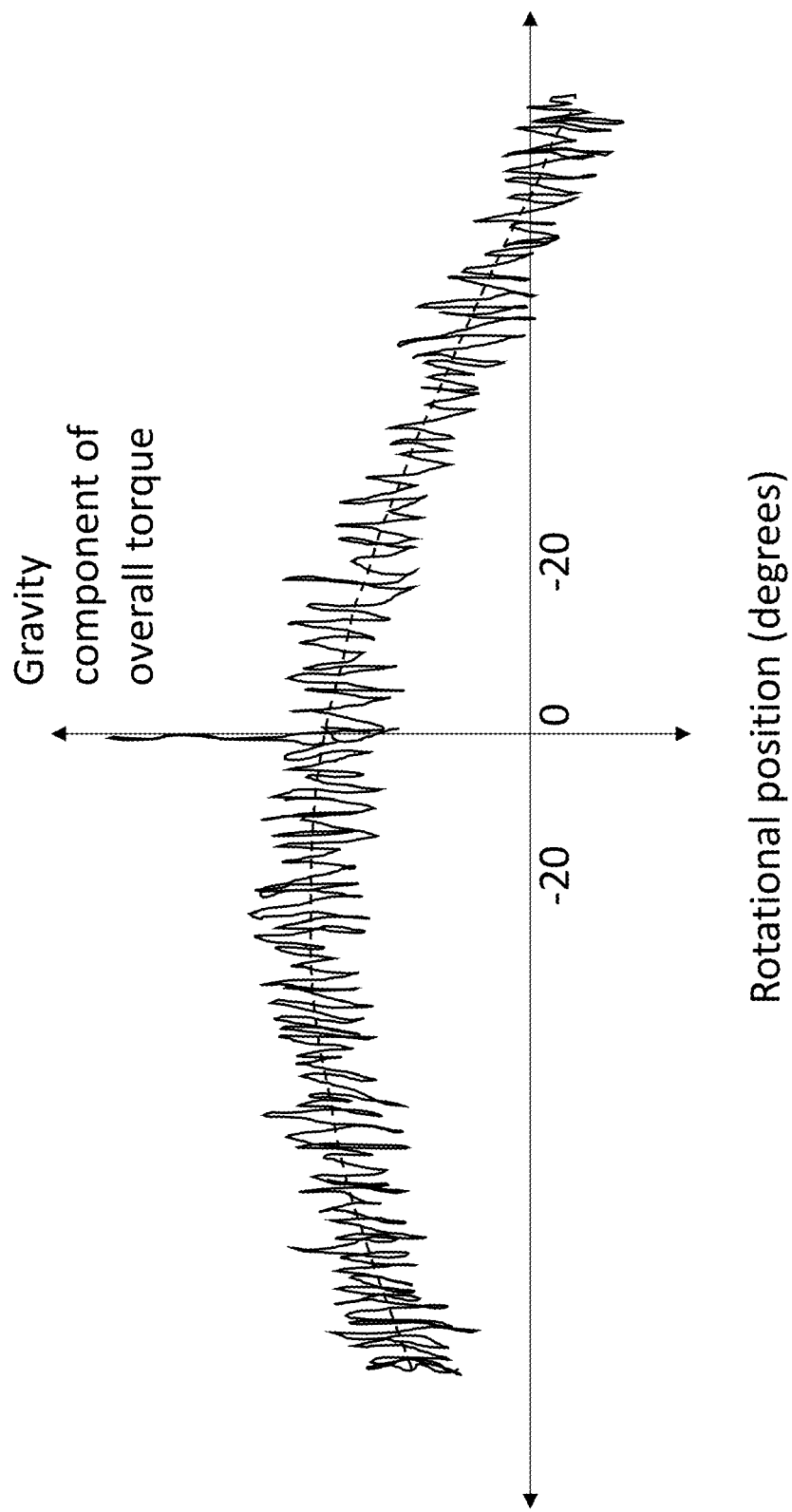

In an embodiment, the computing system 1100 may use the above technique or some other technique to effectively extract, from the actuation data, a component of the overall torque that is due to a weight of an arm segment (e.g., the first arm segment), or more specifically due to an effect of gravity on a CoM of the arm segment. In one example, this component may be expressed as mgr cos (θ+α), and may be obtained by, e.g., subtracting, from the overall torque, a contribution of the actuator (e.g., I$\ddot{\theta}$) and a contribution of friction (e.g., s+b$\dot{\theta}$). For example, FIG. 11A provides an example of values which represent a gravity component of overall torque, which may be approximated as an effect of gravity on the CoM of an arm segment. FIG. 11B illustrates a sinusoidal fit, or more specifically a sinusoidal curve which the the computing system 1100 is using to fit the values in FIG. 11A. In some instances, the computing system 1100 may determine the CoM estimate based on an amplitude and phase shift of the sinusoidal curve. More particularly, the computing system 1100 may be configured to determine a value of mgr based on an amplitude of the sinusoidal curve, while the parameter α may affect a phase shift of the sinusoidal curve. In this example, the computing system 1100 may divide the amplitude of the sinusoidal curve by the weight of the arm segment to determine r, which may represent the CoM of the arm segment.

In an embodiment, when determining an estimate of CoM for a particular arm segment based on actuation data, the computing system 1100 may be configured to take into account an influence that downstream arm segments (e.g., more distal arm segments) may have on the actuation data or other sensor data. More particularly, as discussed above with respect to FIGS. 3A-3C, 5A, and 5B, robot calibration may be performed for a robot arm which has a plurality of arm segments connected as a series of arm segments, in which some arm segments (e.g., $3212_1$-$3212_5$) have one or more arm segments (e.g., $3212_6$) that are further downstream or that are more distal. For example, the first arm segment (e.g., $3212_5$) discussed above may in some instances be connected to one or more distal arm segment (e.g., $3212_6$), which are downstream relative to the first arm segment (e.g., $3212_5$). A weight from the one or more distal arm segments (e.g., $3212_6$) may contribute to the overall torque at the first joint (e.g., $3214_4$), and thus may influence sensor data used to determine the CoM estimate for the first arm segment (e.g., $3212_5$). In such a situation, the computing system 1100 may determine a CoM estimate associated with the one or more distal arm segments (e.g., $3212_6$) before determining a CoM estimate of the first arm segment (e.g., $3212_5$). In this manner, when the computing system 1100 is determining the CoM estimate associated with the first arm segment (e.g., $3212_5$), it may be able to use the earlier-determined CoM estimate associated with the one or more distal arm segments (e.g., $3212_6$) to determine how much the sensor data is influenced by the weight of the one or more distal arm segments, so as to remove or compensate for that influence.

As an example, the computing system 1100 may determine an initial CoM estimate associated with the first arm segment (e.g., $3212_5$) based on a set of actuation data and a set of movement data received in step 4006 and 4008, which may have been generated during movement of the first arm segment. The initial CoM estimate may be influenced by a weight from the one or more distal arm segments (e.g., $3212_6$). Thus, the computing system 1100 may determine, based on the CoM estimate associated with the one or more distal arm segments (e.g., $3212_6$), an adjustment for removing an influence that the one or more distal arm segments (e.g., $3212_6$) have on the initial CoM estimate. The adjustment may cause the initial CoM estimate to be shifted closer to the first joint. The computing system 1100 may apply the adjustment to the initial CoM estimate to generate an adjusted CoM estimate associated with the first arm segment ($3212_5$). The CoM estimate that is determined for robot calibration in step 4010 for the first arm segment (e.g., $3212_5$) may be equal to or based on the adjusted CoM estimate.

In an embodiment, when the computing system 1100 in one iteration of step 4010 has determined a CoM estimate for an arm segment (e.g., the first arm segment), the computing system 1100 may then use the CoM estimate for the arm segment in a next iteration to determine a CoM estimate for an upstream arm segment (e.g., the second arm segment discussed above). In one particular example, the computing system 1100 may perform an earliest iteration or set of iterations of steps of method 4000 to determine a CoM estimate for a joint (e.g., $3214_5$) and/or arm segment (e.g., $3212_6$) that is most distal or furthest downstream in a robot arm (e.g., 3210). The computing system 1100 may perform subsequent iterations or sets of iterations of the steps of method 4000 by proceeding in an upstream direction. More particularly, the computing system 1100 may be configured to use a next iteration of steps 4002-4010 to determine a CoM estimate for an arm segment which is immediately upstream of the most distal arm segment. In this iteration, the computing system may be configured to determine the CoM estimate for this upstream arm segment by removing an influence from the one or more downstream arm segments. This influence from the one or more downstream arm segments may be approximated by the CoM of the most distal arm segment, which may have been determined in a previous iteration of steps 40002-4010.

In an embodiment, when the computing system 1100 is performing an iteration of step 4010 to determine a CoM estimate for a particular arm segment, it may be configured to determine a net influence or net contribution from k downstream arm segments, or more specifically a net influence from respective weights of the downstream arm segments, on actuation data and/or on an initial CoM estimate for an arm segment or current joint being estimated in a particular iteration. For instance, the net influence may be determined based on the formula:

$$\sum_{x=1}^{k} \text{mass arm } segment_x *$$

(distance between arm $segment_x$ and current joint) $* g$

In an embodiment, the computing system 1100 may in step 4010 determine an estimate for a moment of inertia associated with an arm segment. For example, the computing system 1100 may be configured to solve the equations determined above to determine a value for I, which represents the moment of inertia.

As stated above, the method 4000 may have an embodiment in which some or all of steps 4002-4010 are performed multiple times, over multiple iterations or multiple time periods. For instance, one iteration may be performed to cause relative movement between the first arm segment (e.g., $3212_5$) and the second arm segment (e.g., $3212_4$) to determine a friction parameter estimate, while another iteration may be performed to cause additional relative movement between the first arm segment and the second arm segment to determine a CoM estimate. While the above discussion illustrates the steps 4002-4010 with respect to the first arm segment (e.g., $3212_5$) and the first joint (e.g., $3212_4$), other iterations of the steps 4002-4010 may be performed with respect to other arm segments or other joints.

In an embodiment, the method 4000 may include a step which may be performed after performing robot calibration. The step may involve outputting a subsequent set of one or more movement commands for causing subsequent robot arm movement. In one example, the subsequent set of one or more movement commands may be generated based on the friction parameter estimate(s) and/or the CoM estimate(s) determined from the robot calibration. For example, the subsequent set of one or more movement commands may be based on the friction parameter estimate and/or CoM estimate associated with the first arm segment or first joint discussed above. In one example, the friction parameter estimate and/or CoM estimate may be used to update a torque model and/or friction model, which may be used by the computing system 1100 to generate the subsequent set of one or more movement commands. In some instances, the computing system may be configured to generate the subsequent set of one or more movement commands so that they cause one or more actuators (e.g., $3330_1$-$3330_5$) to generate respective amounts of force or torque which compensate for friction between various components of the robot arm (e.g., 3210) and which account for respective locations of CoM for those components.

Additional Discussion of Various Embodiments

Embodiment 1 relates to a computing system comprising a communication interface and at least one processing circuit. The communication interface is configured to communicate with a robot having a robot arm that includes a plurality of arm segments which are movably connected to each other at a plurality of joints. The at least one processing circuit is configured, when the computing system is in communication with the robot, to perform a method, such as by executing instructions on a non-transitory computer-readable medium. The method includes selecting at least one of: (i) a first joint from among the plurality of joints without selecting any other joint of the plurality of joints, or (ii) a first arm segment from among the plurality of arm segments without selecting any other arm segment of the plurality of arm segments, wherein the first joint connects the first arm segment to a second arm segment that is immediately adjacent to the first arm segment. The method further includes outputting a set of one or more movement commands for causing robot arm movement that includes relative movement between the first arm segment and the second arm segment via the first joint; receiving a set of actuation data associated with the first joint or the first arm segment, wherein the set of actuation data is sensor data indicative of overall torque or overall force at the first joint in a time period during which the relative movement between the first arm segment and the second arm segment is occurring; receiving a set of movement data associated with the first joint or the first arm segment, wherein the set of movement data is sensor data indicative of an amount or rate of the relative movement between the first arm segment and the second arm segment during the time period; and determining, based on the set of actuation data and the set of movement data, at least one of: (i) a friction parameter estimate associated with friction between the first arm segment and the second arm segment, or (ii) a center of mass (CoM) estimate associated with the first arm segment; outputting a subsequent set of one or more movement commands for causing subsequent robot arm movement, wherein the subsequent set of one or more movement commands are generated based on the at least one of: (i) the friction parameter estimate or (ii) the CoM estimate associated with the first arm segment.

Embodiment 2 includes the computing system of embodiment 1. In this embodiment, the set of one or more movement commands are for causing the relative movement between the first arm segment and the second arm segment without causing relative movement between any other pair of immediately adjacent arm segments of the plurality of arm segments.

Embodiment 3 includes the computing system of embodiment 2. In this embodiment, the at least one processing circuit is configured, when the robot in communication with the computing system has a plurality of respective actuators for outputting actuation at the plurality of joints, to select a first actuator for activation from among the plurality of actuators without selecting any other actuator of the plurality of actuators for activation, wherein the first actuator corresponds with the first joint or the first arm segment. Further in this embodiment, the set of one or more movement commands generated by the at least one processing circuit are for causing activation of the first actuator without causing activation of any other actuator of the plurality of respective actuators.

Embodiment 4 includes the computing system of embodiment 3. In this embodiment, the set of one or more movement commands are for causing rotation at the first joint without causing rotation at any other joint of the plurality of joints.

Embodiment 5 includes the computing system of any one of embodiments 1-4. In this embodiment, the time period during which the relative movement between the first arm segment and the second arm segment occurs is a first time period. Further, this embodiment includes the following features: the set of one or more movement commands is a first set of one or more movement commands, and is for causing the relative movement between the first arm segment and the second arm segment during the first time period to have a first speed profile; the set of actuation data is a first set of actuation data associated with the first joint or the first arm segment; the set of movement data is a first set of movement data associated with the first joint or the first arm segment, wherein both the first set of actuation data and the first set of movement data are associated with the first speed profile. Further in this embodiment, the at least one processing circuit is configured to determine the friction parameter estimate based on the first set of actuation data and the first set of movement data, and is further configured to perform the following: outputting a second set of one or more movement commands for causing additional relative movement between the first arm segment and the second arm segment via the first joint, and for causing the additional relative movement to have a second speed profile different than the first speed profile; receiving a second set of actuation data associated with the first joint or first arm segment, wherein the second set of actuation data is sensor data indicative of overall torque or overall force at the first joint during a second time period during which the additional relative movement is occurring; receiving a second set of movement data associated with the first joint or first arm segment, wherein the second set of movement data is sensor data indicative of an amount or rate of the additional relative movement during the second time period; determining the CoM estimate based on the second set of actuation data and the second set of movement data. Further in this embodiment, the subsequent set of one or more movement commands are generated based on the friction parameter estimate and the CoM estimate.

Embodiment 6 includes the computing system of embodiment 5. In this embodiment, the first speed profile includes a first plurality of values for rotational speed corresponding to different points in time within the first time period, wherein at least one of the first plurality of values is equal to a predefined maximum operation speed. Further in this embodiment, the second speed profile includes a second plurality of values for rotational speed corresponding to different points in time within the second time period, wherein all of the second plurality of values are less than or equal to a predefined speed threshold.

Embodiment 7 includes the computing system of any one of embodiments 1-5. In this embodiment, the set of one or more movement commands are generated for causing the rate of the relative movement to reach a predefined maximum operation speed during at least a portion of the time period, such that at least a portion of the set of actuation data and at least a portion of the set of movement data corresponds to the predefined maximum operation speed. Further in this embodiment, the at least one processing circuit is configured to determine the friction parameter estimate based on the set of actuation data and the set of movement data.

Embodiment 8 includes the computing system of embodiment 7. In this embodiment, the friction parameter estimate is an estimate of a coefficient of viscous friction, or is an estimate of coulomb friction.

Embodiment 9 includes the computing system of any one of embodiments 1-5. In this embodiment, the set of one or more movement commands are generated for causing the rate of the relative movement to be less than or equal to a predefined acceleration threshold during an entirety of the time period in which the relative movement is occurring. Further in this embodiment, the at least one processing circuit is configured to determine the CoM estimate based on the set of actuation data and the set of movement data.

Embodiment 10 includes the computing system of any one of embodiments 1-9. In this embodiment, the at least one processing circuit is configured, when the set of one or more movement commands are for causing relative rotation between the first arm segment and the second arm segment via the first joint, to perform the following: determining whether a rotational axis for the relative rotation is within an imaginary cone which represents a range of orientations for the rotational axis, wherein the range of orientations include a vertical orientation, and wherein respective angles between the vertical orientation and all other orientations in the range of orientations is less than or equal to a predefined angle threshold; and outputting an indication of whether the rotational axis is within the imaginary cone.

Embodiment 11 includes the computing system of any one of embodiments 1-10. In this embodiment, the at least one processing circuit is configured, when the plurality of arm segments are connected as a series of arm segments, and include one or more distal arm segments downstream of the first arm segment, to determine a CoM estimate associated with the one or more distal arm segments. Further in this embodiment, the CoM estimate associated with the first arm segment is determined based on the CoM estimate associated with the one or more distal arm segments.

Embodiment 12 includes the computing system of embodiment 11. In this embodiment, the at least one processing circuit is configured to determine the CoM estimate associated with the first arm segment by: determining an initial CoM estimate associated with the first arm segment based on the set of actuation data and the set of movement data; determining, based on the CoM estimate associated with the one or more distal arm segments, an adjustment for removing an influence that the one or more distal arm segments have on the initial CoM estimate; and applying the adjustment to the initial CoM estimate to generate an adjusted CoM estimate associated with the first arm segment, wherein the CoM estimate associated with the first arm segment is equal to or based on the adjusted CoM estimate.

Embodiment 13 includes the computing system of embodiment 12. In this embodiment, the at least one processing is configured, when the second arm segment is upstream of the first arm segment, to determine a CoM estimate associated with the second arm segment based on the CoM estimate associated with the first arm segment.

Embodiment 14 includes the computing system of any one of embodiments 1-13. In this embodiment, the at least one processing circuit is further configured to determine a range of motion for the relative movement between the first arm segment and the second arm segment, wherein the set of one or more movement commands are generated based on the range of motion.

Embodiment 15 includes the computing system of any one of embodiments 1-14. In this embodiment, the at least one processing circuit is configured, when the set of actuation data measures electrical current flowing through an actuator for causing the relative movement between the first arm segment and the second arm segment, to determine the overall torque at the first joint based on the electrical current.

Embodiment 16 includes the computing system of any one of embodiments 1-15. In this embodiment, the at least one processing circuit is further configured to determine, based on the set of actuation data and the set of movement data, a moment of inertia estimate associated with the first arm segment.

Embodiment 17 includes the computing system of any one of embodiments 1-16. This embodiment has the following features: the time period during which the relative movement between the first arm segment and the second arm segment occurs is a first time period; the set of actuation data associated with the first joint or the first arm segment is a first set of actuation data, and the set of movement data associated with the first joint or the first arm segment is a first set of movement data; the set of one or more movement commands is a first set of one or more movement commands; the friction parameter estimate associated with friction between the first arm segment and the second arm segment is a first friction parameter estimate; the CoM estimate associated with the first arm segment is a first CoM estimate. In this embodiment, the at least one processing circuit is configured to perform the following: selecting at least one of: (i) a second joint from among the plurality of joints without selecting any other joint of the plurality of joints, or (ii) the second arm segment from among the plurality of arm segments without selecting any other arm segment of the plurality of arm segments, wherein the second joint connects the second arm segment to a third arm segment that is immediately adjacent to the second arm segment; outputting a second set of one or more movement commands for causing robot arm movement that includes relative movement between the second arm segment and the third arm segment via the second joint; receiving a second set of actuation data and a second set of movement data, wherein the second set of actuation data is sensor data indicative of overall torque or overall force at the second joint during a second time period during in which the relative movement between the second arm segment and the third arm segment is occurring, and wherein the second set of movement data is sensor data indicative of an amount or rate of the relative movement between the second arm segment and the third arm segment during the second time period; determining, based on the second set of actuation data and the second set of movement data, at least one of: (i) a second friction parameter estimate, or (ii) a second CoM estimate, wherein the second friction parameter estimate is associated with friction between the second arm segment and the third arm segment, and the second CoM estimate is indicative of a CoM of the second arm segment. Further in this embodiment, the subsequent set of one or more movement commands are generated further based on the at least one of: (i) the second friction parameter estimate or (ii) the second CoM estimate.

It will be apparent to one of ordinary skill in the relevant arts that other suitable modifications and adaptations to the methods and applications described herein may be made without departing from the scope of any of the embodiments. The embodiments described above are illustrative examples and it should not be construed that the present invention is limited to these particular embodiments. It should be understood that various embodiments disclosed herein may be combined in different combinations than the combinations specifically presented in the description and accompanying drawings. It should also be understood that, depending on the example, certain acts or events of any of the processes or methods described herein may be performed in a different sequence, may be added, merged, or left out altogether (e.g., all described acts or events may not be necessary to carry out the methods or processes). In addition, while certain features of embodiments hereof are described as being performed by a single component, module, or unit for purposes of clarity, it should be understood that the features and functions described herein may be performed by any combination of components, units, or modules. Thus, various changes and modifications may be affected by one skilled in the art without departing from the spirit or scope of the invention as defined in the appended claims.

The invention claimed is:

1. A computing system comprising:
a communication interface configured to communicate with a robot having a robot arm that includes a plurality of arm segments which are movably connected to each other at a plurality of joints; and
at least one processing circuit configured, when the computing system is in communication with the robot, to perform the following:
selecting at least one of: (i) a first joint from among the plurality of joints without selecting any other joint of the plurality of joints, or (ii) a first arm segment from among the plurality of arm segments without selecting any other arm segment of the plurality of arm segments, wherein the first joint connects the first arm segment to a second arm segment that is immediately adjacent to the first arm segment;
outputting a set of one or more movement commands for causing robot arm movement that includes relative movement between the first arm segment and the second arm segment via the first joint;
receiving a set of actuation data associated with the first joint or the first arm segment, wherein the set of actuation data is sensor data indicative of overall torque or overall force at the first joint in a time period during which the relative movement between the first arm segment and the second arm segment is occurring;
receiving a set of movement data associated with the first joint or the first arm segment, wherein the set of movement data is sensor data indicative of an amount or rate of the relative movement between the first arm segment and the second arm segment during the time period;
determining, based on the set of actuation data and the set of movement data, at least one of: (i) a friction parameter estimate associated with friction between the first arm segment and the second arm segment, or (ii) a center of mass (CoM) estimate associated with the first arm segment; and
outputting a subsequent set of one or more movement commands for causing subsequent robot arm movement, wherein the subsequent set of one or more movement commands are generated based on the at least one of: (i) the friction parameter estimate or (ii) the CoM estimate associated with the first arm segment.

2. The computing system of claim 1, wherein the set of one or more movement commands are for causing the relative movement between the first arm segment and the second arm segment without causing relative movement between any other pair of immediately adjacent arm segments of the plurality of arm segments.

3. The computing system of claim 2, wherein the at least one processing circuit is configured, when the robot in communication with the computing system has a plurality of actuators for outputting actuation at the plurality of joints, to select a first actuator for activation from among the plurality of actuators without selecting any other actuator of the plurality of actuators for activation, wherein the first actuator corresponds with the first joint or the first arm segment, and
wherein the set of one or more movement commands generated by the at least one processing circuit are for causing activation of the first actuator without causing activation of any other actuator of the plurality of actuators.

4. The computing system of claim 3, wherein the set of one or more movement commands are for causing rotation at the first joint without causing rotation at any other joint of the plurality of joints.

5. The computing system of claim 1, wherein:
the time period during which the relative movement between the first arm segment and the second arm segment occurs is a first time period,
the set of one or more movement commands is a first set of one or more movement commands, and is for causing the relative movement between the first arm segment and the second arm segment during the first time period to have a first speed profile,
the set of actuation data is a first set of actuation data associated with the first joint or the first arm segment,
the set of movement data is a first set of movement data associated with the first joint or the first arm segment, wherein both the first set of actuation data and the first set of movement data are associated with the first speed profile, and
the at least one processing circuit is configured to determine the friction parameter estimate based on the first set of actuation data and the first set of movement data, and is further configured to perform the following:
outputting a second set of one or more movement commands for causing additional relative movement between the first arm segment and the second arm segment via the first joint, and for causing the additional relative movement to have a second speed profile different than the first speed profile;
receiving a second set of actuation data associated with the first joint or first arm segment, wherein the second set of actuation data is sensor data indicative of overall torque or overall force at the first joint during a second time period during which the additional relative movement is occurring;
receiving a second set of movement data associated with the first joint or first arm segment, wherein the second set of movement data is sensor data indicative of an amount or rate of the additional relative movement during the second time period; and
determining the CoM estimate based on the second set of actuation data and the second set of movement data,
wherein the subsequent set of one or more movement commands are generated based on the friction parameter estimate and the CoM estimate.

6. The computing system of claim 5, wherein the first speed profile includes a first plurality of values for rotational speed corresponding to different points in time within the first time period, wherein at least one of the first plurality of values is equal to a predefined maximum operation speed, and
wherein the second speed profile includes a second plurality of values for rotational speed corresponding to different points in time within the second time period, wherein all of the second plurality of values are less than or equal to a predefined speed threshold.

7. The computing system of claim 1, wherein the set of one or more movement commands are generated for causing the rate of the relative movement to reach a predefined maximum operation speed during at least a portion of the time period, such that at least a portion of the set of actuation data and at least a portion of the set of movement data corresponds to the predefined maximum operation speed, wherein the at least one processing circuit is configured to determine the friction parameter estimate based on the set of actuation data and the set of movement data.

8. The computing system of claim 7, wherein the friction parameter estimate is an estimate of a coefficient of viscous friction, or is an estimate of coulomb friction.

9. The computing system of claim 1, wherein the set of one or more movement commands are generated for causing the rate of the relative movement to be less than or equal to a predefined acceleration threshold during an entirety of the time period in which the relative movement is occurring, wherein the at least one processing circuit is configured to determine the CoM estimate based on the set of actuation data and the set of movement data.

10. The computing system of claim 1, wherein the at least one processing circuit is configured, when the set of one or more movement commands are for causing relative rotation between the first arm segment and the second arm segment via the first joint, to perform the following:
determining whether a rotational axis for the relative rotation is within an imaginary cone which represents a range of orientations for the rotational axis, wherein the range of orientations include a vertical orientation, and wherein respective angles between the vertical orientation and all other orientations in the range of orientations is less than or equal to a predefined angle threshold; and
outputting an indication of whether the rotational axis is within the imaginary cone.

11. The computing system of claim 1, wherein the at least one processing circuit is configured, when the plurality of arm segments are connected as a series of arm segments, and include one or more distal arm segments downstream of the first arm segment, to determine a CoM estimate associated with the one or more distal arm segments,
wherein the CoM estimate associated with the first arm segment is determined based on the CoM estimate associated with the one or more distal arm segments.

12. The computing system of claim 11, wherein the at least one processing circuit is configured to determine the CoM estimate associated with the first arm segment by:
determining an initial CoM estimate associated with the first arm segment based on the set of actuation data and the set of movement data;
determining, based on the CoM estimate associated with the one or more distal arm segments, an adjustment for removing an influence that the one or more distal arm segments have on the initial CoM estimate; and
applying the adjustment to the initial CoM estimate to generate an adjusted CoM estimate associated with the first arm segment, wherein the CoM estimate associated with the first arm segment is equal to or based on the adjusted CoM estimate.

13. The computing system of claim 12, wherein the at least one processing circuit is configured, when the second arm segment is upstream of the first arm segment, to determine a CoM estimate associated with the second arm segment based on the CoM estimate associated with the first arm segment.

14. The computing system of claim 1, wherein the at least one processing circuit is further configured to determine a range of motion for the relative movement between the first arm segment and the second arm segment, wherein the set of one or more movement commands are generated based on the range of motion.

15. The computing system of claim 1, wherein the at least one processing circuit is configured, when the set of actuation data measures electrical current flowing through an actuator for causing the relative movement between the first arm segment and the second arm segment, to determine the overall torque at the first joint based on the electrical current.

16. The computing system of claim 1, wherein the at least one processing circuit is further configured to determine, based on the set of actuation data and the set of movement data, a moment of inertia estimate associated with the first arm segment.

17. The computing system of claim 1, wherein:
the time period during which the relative movement between the first arm segment and the second arm segment occurs is a first time period,
the set of actuation data associated with the first joint or the first arm segment is a first set of actuation data, and the set of movement data associated with the first joint or the first arm segment is a first set of movement data,
the set of one or more movement commands is a first set of one or more movement commands,
the friction parameter estimate associated with friction between the first arm segment and the second arm segment is a first friction parameter estimate,
the CoM estimate associated with the first arm segment is a first CoM estimate, and
wherein the at least one processing circuit is configured to perform the following:
selecting at least one of: (i) a second joint from among the plurality of joints without selecting any other joint of the plurality of joints, or (ii) the second arm segment from among the plurality of arm segments without selecting any other arm segment of the plurality of arm segments, wherein the second joint connects the second arm segment to a third arm segment that is immediately adjacent to the second arm segment;
outputting a second set of one or more movement commands for causing robot arm movement that includes relative movement between the second arm segment and the third arm segment via the second joint;
receiving a second set of actuation data and a second set of movement data, wherein the second set of actuation data is sensor data indicative of overall torque or overall force at the second joint during a second time period during in which the relative movement between the second arm segment and the third arm segment is occurring, and wherein the second set of movement data is sensor data indicative of an amount or rate of the relative movement between the second arm segment and the third arm segment during the second time period; and
determining, based on the second set of actuation data and the second set of movement data, at least one of: (i) a second friction parameter estimate, or (ii) a second CoM estimate, wherein the second friction parameter estimate is associated with friction between the second arm segment and the third arm segment, and the second CoM estimate is indicative of a CoM of the second arm segment, and the subsequent set of one or more movement commands are generated further based on the at least one of: (i) the second friction parameter estimate or (ii) the second CoM estimate.

18. A non-transitory computer-readable medium having instructions thereon that, when executed by at least one processing circuit of a computing system, causes the at least one processing circuit to perform the following:

selecting, when the computing system is in communication with a robot having a robot arm that includes a plurality of arm segments which are movably connected to each other at a plurality of joints, at least one of: (i) a first joint from among the plurality of joints without selecting any other joint of the plurality of joints, or (ii) a first arm segment from among the plurality of arm segments without selecting any other arm segment of the plurality of arm segments, wherein the first joint connects the first arm segment to a second arm segment that is immediately adjacent to the first arm segment;

outputting a set of one or more movement commands for causing robot arm movement that includes relative movement between the first arm segment and the second arm segment via the first joint;

receiving a set of actuation data associated with the first joint or the first arm segment, wherein the set of actuation data is sensor data indicative of overall torque or overall force at the first joint in a time period during which the relative movement between the first arm segment and the second arm segment is occurring;

receiving a set of movement data associated with the first joint or the first arm segment, wherein the set of movement data is sensor data indicative of an amount or rate of the relative movement between the first arm segment and the second arm segment during the time period;

determining, based on the set of actuation data and the set of movement data, at least one of: (i) a friction parameter estimate associated with friction between the first arm segment and the second arm segment, or (ii) a center of mass (CoM) estimate associated with the first arm segment; and outputting a subsequent set of one or more movement commands for causing subsequent robot arm movement, wherein the subsequent set of one or more movement commands are generated based on the at least one of: (i) the friction parameter estimate or (ii) the CoM estimate associated with the first arm segment.

19. The non-transitory computer-readable medium of claim 18, wherein the set of one or more movement commands are for causing the relative movement between the first arm segment and the second arm segment without causing relative movement between any other pair of immediately adjacent arm segments of the plurality of arm segments.

20. A method comprising:

selecting, by a computing system configured to communicate with a robot having a robot arm that includes a plurality of arm segments which are movably connected to each other at a plurality of joints, at least one of: (i) a first joint from among the plurality of joints without selecting any other joint of the plurality of joints, or (ii) a first arm segment from among the plurality of arm segments without selecting any other arm segment of the plurality of arm segments, wherein the first joint connects the first arm segment to a second arm segment that is immediately adjacent to the first arm segment;

outputting, by the computing system, a set of one or more movement commands for causing robot arm movement that includes relative movement between the first arm segment and the second arm segment via the first joint;

receiving, by the computing system, a set of actuation data associated with the first joint or the first arm segment, wherein the set of actuation data is sensor data indicative of overall torque or overall force at the first joint in a time period during which the relative movement between the first arm segment and the second arm segment is occurring;

receiving, by the computing system, a set of movement data associated with the first joint or the first arm segment, wherein the set of movement data is sensor data indicative of an amount or rate of the relative movement between the first arm segment and the second arm segment during the time period;

determining, by the computing system based on the set of actuation data and the set of movement data, at least one of: (i) a friction parameter estimate associated with friction between the first arm segment and the second arm segment, or (ii) a center of mass (CoM) estimate associated with the first arm segment; and outputting, by the computing system, a subsequent set of one or more movement commands for causing subsequent robot arm movement, wherein the subsequent set of one or more movement commands are generated based on the at least one of: (i) the friction parameter estimate or (ii) the CoM estimate associated with the first arm segment.

* * * * *